(12) United States Patent
Milender et al.

(10) Patent No.: US 6,554,742 B2
(45) Date of Patent: Apr. 29, 2003

(54) MODIFICATION OF SHIFTING CHARACTERISTICS BASED UPON SHIFTING DIRECTION AND DRIVE TRAIN LOAD

(75) Inventors: Jeffrey S. Milender, Valley City, ND (US); Thomas G. Lykken, Fargo, ND (US); Bradley A. Kuczmarski, Denver, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/747,487

(22) Filed: Dec. 21, 2000

(65) Prior Publication Data

US 2002/0128118 A1 Sep. 12, 2002

(51) Int. Cl.$^7$ .............................................. F16H 61/04
(52) U.S. Cl. ...................................................... 477/155
(58) Field of Search ......................................... 477/155

(56) References Cited

U.S. PATENT DOCUMENTS

| | | | |
|---|---|---|---|
| 4,622,637 A | 11/1986 | Tomita et al. ........... | 364/424.1 |
| 4,763,545 A * | 8/1988 | Shibayama et al. ......... | 477/155 |
| 4,817,473 A | 4/1989 | Baltusis et al. ............... | 74/869 |
| 4,913,004 A | 4/1990 | Panoushek et al. ........... | 74/861 |
| 5,070,746 A * | 12/1991 | Milunas et al. .............. | 477/155 |
| 5,083,647 A | 1/1992 | Bulgrien ..................... | 192/3.58 |
| 5,119,697 A * | 6/1992 | Vukovich et al. ........... | 477/155 |
| 5,125,293 A * | 6/1992 | Takizawa .................... | 477/155 |
| 5,151,858 A * | 9/1992 | Milunas et al. ............. | 477/155 |
| 5,467,854 A | 11/1995 | Creger et al. ............ | 192/87.18 |
| 5,551,930 A | 9/1996 | Creger et al. ................ | 477/130 |
| 5,778,329 A | 7/1998 | Officer et al. ................. | 701/55 |
| 6,231,479 B1 * | 5/2001 | Kraska et al. ............... | 477/155 |
| 6,319,172 B1 * | 11/2001 | Steinmetz et al. ........... | 477/155 |

* cited by examiner

Primary Examiner—Dirk Wright
(74) Attorney, Agent, or Firm—A. N. Trausch

(57) ABSTRACT

An apparatus and method for controlling a plurality of clutches in a powershift transmission. The transmission is coupled to an engine of an off-road vehicle. The method includes receiving a shift command having a shift direction. Clutch timing is selected based on the shift direction. Using the selected shift timing, on-coming clutches are engaged in sequence with disengagement of off-going clutches to achieve smooth shifting.

32 Claims, 12 Drawing Sheets

MODIFICATION OF SHIFTING CHARACTERISTICS BASED UPON SHIFTING DIRECTION AND DRIVE TRAIN LOAD

FIELD OF THE INVENTION

The exemplary embodiment relates to electronically controlled powershift transmissions for large off-road vehicles. More particularly, the exemplary embodiment relates to a system and a method for shifting the transmission of an agricultural or earth moving vehicle by controlling the engagement of a plurality of clutches in accordance with vehicle loading.

BACKGROUND OF THE INVENTION

In the field of transmission systems, a number of transmission configurations and control schemes have been proposed and are presently in use. Such transmissions typically include a collection of intermeshing gears either fixed to transmission shafts or rotating freely on the shafts. Clutches associated with the freely rotating gears may be selectively engaged to establish a series of speed ratios between an engine output shaft and a transmission output shaft to transmit engine torque at a desired speed to driven wheels of the vehicle. Control systems for commanding engagement of the clutches typically include electronic circuitry that responds to operator controls, such as a shift lever, a direction lever and the like in the vehicle cab. The control system sends electronic signals to hydraulic valves that channel pressurized fluid to the clutches. The control systems thus cause the clutches to engage and disengage in predetermined combinations to accelerate, decelerate and drive the vehicle as desired by the operator. Transmissions and control systems of this type are described in U.S. Pat. No. 4,425,620, issued on Jan. 10, 1984 and assigned to Steiger Tractor, Inc., and U.S. Pat. No. 4,967,385, issued on Oct. 30, 1990 and assigned to J.I. Case Company.

Direct shifting between gears is often provided in transmissions such as those described above. This process, called "power shifting", involves disengaging a first set of one or more clutches (the "off-going clutches") while substantially simultaneously engaging a second set of one or more clutches (the "on-coming clutches"). Powershift transmissions are particularly useful for a wide variety of off-road vehicles including, but not limited to, large agricultural vehicles and construction vehicles. Large agricultural vehicles include, but are not limited to, tractors, combines, sprayers and bailers. Representative construction vehicles include, but are not limited to, bulldozers, road graders and earth movers.

These powershift transmissions typically include a number of proportionally-engaged clutches. In general, proportional engagement is accomplished by metering hydraulic fluid to the clutches in response to a shift command. The speed at which the clutch is engaged is controlled by the metered amount of hydraulic fluid entering the clutch. Thus, by carefully controlling fluid pressure entering a clutch, clutch engagement is controlled and smooth transmission operation is achieved. While smooth operation is achievable through careful fluid metering and pressure control, this control is not without complications. For example, these transmissions require valves with orifices for regulating pressure. These valves require complicated calibration routines and are prone to failure.

As mentioned, powershift transmissions including proportional clutches typically provide for multiple forward and reverse gear ratios. Shifting between any of the forward or reverse gear ratios, or between neutral and a forward or reverse gear ratio, typically involves engaging various combinations of the proportionally engaged clutches to achieve the desired forward or reverse gear ratio.

During operation, agricultural and construction vehicles experience a wide range of loading conditions. For example, a tractor may be heavily loaded by a fully-engaged implement, partially loaded by partial implement engagement or rolling implement applications, or lightly loaded during transport operations. In addition to variable loading conditions, these vehicles are operated at a wide range of throttle conditions including part-throttle and full-throttle.

To avoid excess wear to a vehicle, vehicle loading must be determined to properly engage clutches within the powershift transmission. This is because the load on the vehicle influences how quickly the shift should be executed. For example, if the vehicle is lightly loaded, a rapid engagement of the desired proportional clutch will cause the vehicle to "lurch" significantly as the shift is completed. Lurching stresses both the internal components of the powershift transmission and also the drive line components of the vehicle. Further, lurching produced by rapid engagement can add to operator fatigue as the vehicle is operated over a prolonged period of time.

A simple solution would be to merely engage the clutch slowly. However, where a vehicle is heavily loaded, a slow engagement of the desired clutch will cause almost instant deceleration of the vehicle, thus producing a significant, momentary "jolt" as an off-going clutch disengages while an on-coming clutch is slowly brought to complete engagement. This condition, similar to the aforementioned rapid engagement under light loading, excessively stresses both the power transmission and the drive line components of the vehicle. Additionally, the speed of the vehicle and/or engine torque may drop significantly during the time interval between the off-going clutch disengaging and the on-coming clutch fully engaging, thus causing the engine torque to drop below the peak point.

Therefore, it is desirable to control the engagement timing of a clutch as a function of vehicle loading. Accordingly, where the vehicle is operating under a no-load condition, the clutch should preferably be engaged later to produce a "smooth" shift, and to prevent lurching. Conversely, where the vehicle is heavily loaded, the clutch should be engaged more quickly than during a no-load condition to avoid sudden deceleration of the vehicle as the shift is executed. Also, clutch engagement should be controlled between the extremes of heavy and light loading.

Significant effort has been expended to resolve the aforementioned powershift transmission problems. The conventional solutions have focussed on controlling the timing of upshift engagement of clutches in power transmissions. While the conventional solutions dramatically decrease wear during upshifts, wear during downshifts remains significant. This excessive wear to both the power transmission and the drive line components of the vehicle has been reduced where upshift control has been replicated to control a downshift of the same gears. For example, the control associated with a shift from fourth gear to fifth gear is replicated to control a shift from fifth gear to fourth gear. While this reduces wear, the wear is still excessive.

For example, one existing solution incorporates a table value used for both upshifting and downshifting. When the shift is commanded, the table is accessed to provide the appropriate clutch engagement timing. The same timing is used for both up-and downshifts between the same gears.

An expanded version of the aforementioned solution provides multiple table values associated with different levels of vehicle loading. Thus, when a shift is commanded, the table is accessed to provide appropriate clutch engagement timing for a specified vehicle load level. However, this is somewhat complicated by the difficulty of adequately ascertaining vehicle loading. While traditional powertrain systems employ a variety of sensors to determine engine and transmission operating conditions, at present it is difficult to directly measure the vehicle loading. Therefore, it is necessary to determine the vehicle loading from known engine operating conditions.

Various methods have been developed to indirectly determine vehicle loading. For example, one method depends upon monitoring a turbocharger employed as part of the vehicle engine. More specifically, the rate of engine exhaust gas flow increases causing the turbocharger to draw in a greater amount of ambient air as the engine rpm increases. The increase in ambient air allows the turbocharger to develop a greater boost pressure in the intake manifold of the engine. Since the boost pressure increases almost as quickly as the engine torque develops, the boost pressure at any given time itself represents a very good approximation of the torque being generated at the same instant by the engine. Thus, vehicle loading at any given time may be approximated by empirical analysis of data received from monitoring turbo boost pressure at a given throttle position, typically full throttle. Using this technique, an accurate engine torque, and hence vehicle loading can be determined when the engine is operating at full throttle.

While this method is useful, it is not applicable where the engine does not include a turbocharger. Further, the method only operates properly when the vehicle is under full throttle conditions. Where full throttle conditions do not exist, this technique does not accurately approximate engine load, resulting in an inconsistent shift as heretofore described.

Thus, a new apparatus and method for controlling shifting in a powershift transmission is needed. In particular, it is desirable to eliminate pressure metered valves. Further, there is a need for an apparatus and method for adequately controlling both upshifts and downshifts of a powershift transmission, with the upshifts and downshifts provided in accordance with the vehicle loading. Thereby, consistent shifts between various gear ratios of the transmission are achieved over various engine load and throttle conditions. Still further, there is a need for an apparatus and method for monitoring engine loading and to thereby obtain an accurate approximation of vehicle loading. Vehicle load should be obtainable at various throttle positions and not depend upon the presence of a turbocharger, the accurate vehicle loading information being useful to control the rate of engagement of a proportional clutch during both upshift and downshift associated with the pertinent clutch.

SUMMARY OF THE INVENTION

In accordance with an exemplary embodiment, a method of controlling a plurality of clutches in a powershift transmission is disclosed. The transmission is coupled to an engine of a work vehicle. The method provides for receiving a shift command having a shift direction; selecting clutch timing based on the shift direction of the received shift command; engaging an on-coming clutch; and disengaging an off-going clutch before, after, or during engaging the on-coming clutch, wherein the time delay, if any, between engaging the on-coming clutch and disengaging the off-going clutch is based on the selected clutch timing.

In accordance with another exemplary embodiment, an apparatus for controlling operation of a powershift transmission is disclosed. The transmission is coupled to an engine of an off-road vehicle. The apparatus includes a sensor for sensing vehicle load. The invention further includes a plurality of on/off valves for controlling fluid flow to a plurality of clutches in the transmission. A table of clutch parameters corresponding to vehicle load and clutch characteristics is utilized to control sequencing of valve energization. Sequencing of valve energization provides clutch sequencing that provides for smooth shifting.

In accordance with yet another exemplary embodiment, an electronic transmission control system for controlling clutch sequencing in a powershift transmission is disclosed. The transmission is coupled to an engine of a work vehicle. The control system includes a sensor configured to sense vehicle load and to provide a load signal. The control system further includes a plurality of tables having clutch timing parameters and a controller. The controller is configured to receive the load signal and to select one of the plurality of tables based on the load signal. Each table corresponds to a first range of vehicle loads during an upshift and a second range of vehicle loads during a downshift, the first and second ranges being different. The controller controls the sequencing of the clutches based on a clutch timing parameter from the selected table.

In accordance with yet another exemplary embodiment, an apparatus for controlling a plurality of clutches in a powershift transmission is disclosed. The transmission is coupled to an engine of an off-road vehicle. The apparatus includes a means for receiving a shift command. In addition, the method includes a means for selecting clutch timing that is dependent upon shift direction of the received shift command. Further, a means for engaging and disengaging clutches is included. The selected shift timing is used in conjunction with the means for enganging and disengaging to provide smooth shifting.

BRIEF DESCRIPTION OF THE DRAWINGS

The exemplary embodiments will hereafter be described with reference to the accompanying drawings, wherein like numerals denote like elements, and.

DETAILED DESCRIPTION OF THE EXEMPLARY EMBODIMENTS

Discussion of the exemplary embodiments is incrementally developed to aid the reader's understanding. Specifically, a foundation is provided by describing the relationship between a controlled clutch and other elements of an off-road vehicle. Next, the operation of the individual clutch of the prior discussion is described. The clutch operation discussion is followed by a description of the individual clutch fill time and calibration. With the preceding sections completed, the reader has sufficient understanding of clutch operation to understand the inter-relationship of multiple clutches in a transmission. Operation of a powershift transmission including a plurality of clutches is described next. It should be understood that the individual clutch discussed in the prior sections is applicable to each of the plurality of clutches discussed in relation to the powershift transmission. Finally, sequencing of the plurality of clutches in the powershift transmission is described.

Through reading the description, the reader is exposed to an apparatus and method that advantageously provides for shift sequencing in a powershift transmission. This sequencing allows for control of torque holes and elimination of transmission lockup. Advantageously, the exemplary embodiment allows for shift sequencing dependent upon both vehicle load and shift direction. As will be discussed, it is desirable to eliminate torque holes during upshifts, yet allow small torque holes during downshifts. Thus, the ability to control clutch sequencing in a manner that depends upon shift direction is very useful. As will also be discussed, it is advantageous to control clutch sequencing as a function of vehicle load.

1. Relationship of a Clutch to Other Elements of an Off-Road Vehicle

Figure 1:
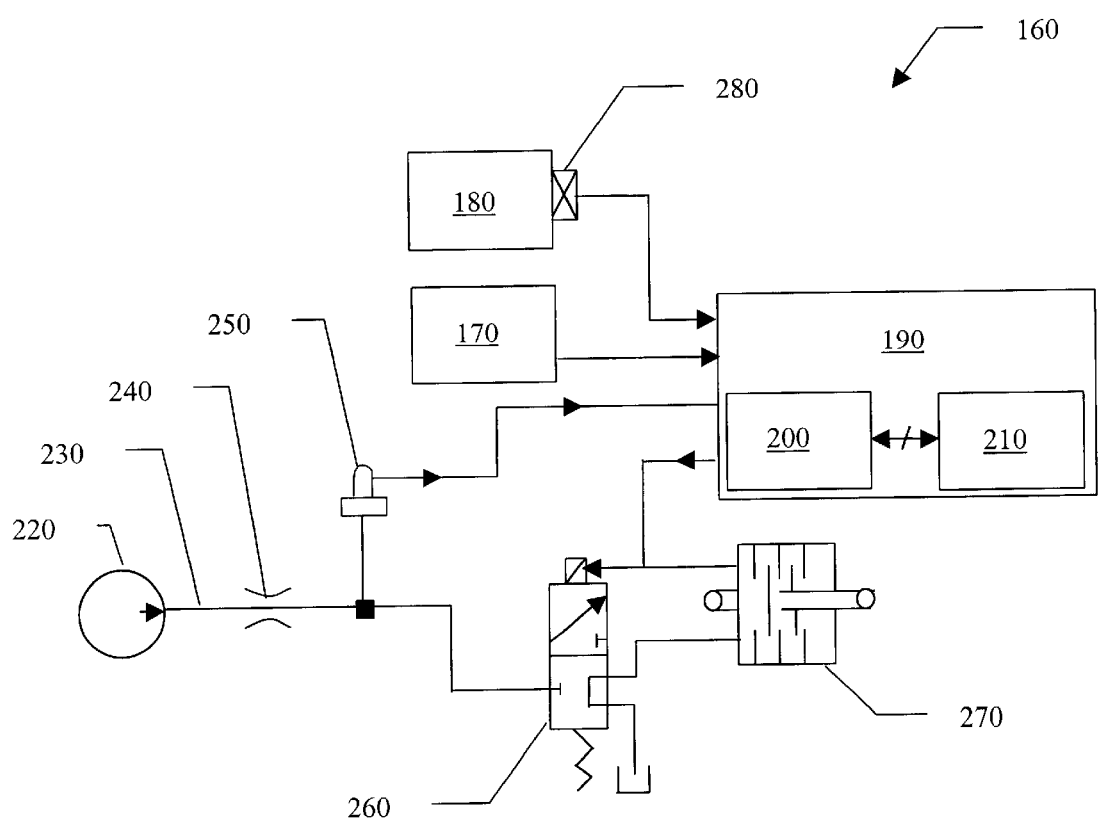
FIG. 1 is a schematic diagram showing elements related to controlling a clutch in a transmission.

FIG. 1 illustrates a block diagram of an off-road vehicle including a clutch engagement apparatus 160. Cutch engagement apparatus 160 utilizes inputs from sensors 280 monitoring a vehicle engine 180. In addition, clutch engagement apparatus 160 utilizes inputs from a shift initiator 170. Clutch engagement apparatus 160 includes a hydraulic supply 220 and a clutch 270. Apparatus 160 includes a valve 260 coupled to clutch 270. Valve 260, in turn, is coupled to hydraulic supply 220 via a hydraulic conduit 230. Hydraulic conduit 230 is also coupled to a pressure transducer 250. A fluid flow restrictor 240 is located in conduit 230 between hydraulic supply 220 and valve 260. A controller 190 is coupled to valve 260, pressure transducer 250, sensors 280, and shift initiator 170. Controller 190 includes a processor 200 and a memory 210.

Clutch 270 is preferably a normally open hydraulic clutch, e.g. one that is engaged by filling with fluid. Valve 260 regulates a flow of hydraulic fluid between hydraulic supply 220 and clutch 270. Advantageously, valve 260 is an on/off valve which is not as prone to failure nor requires calibration like a pressure metered valve. Valve 260 is preferably a solenoid-actuated, spring return 3-way valve having an open and a closed position, i.e. opened to allow a flow into clutch 270, or de-energized, i.e. closed to allow fluid to flow out of clutch 270. Valve 260 preferably includes a reverse flow preventing check valve in the energized position. This feature of valve 260 effectively prevents back flow through valve 260 in the event pressure supply to valve 260 drops temporarily with valve 260 in its energized state. Pressure transducer 250, disposed between valve 260 and hydraulic supply 220, measures hydraulic pressure in the conduit and produces a signal indicative of this hydraulic pressure. Fluid flow restrictor 240 is disposed in conduit 230 between hydraulic supply 220 and valve 260 to create a drop in hydraulic pressure between hydraulic supply 220 and valve 260 when valve 260 is opened and fluid flows into clutch 270. Pressure transducer 250 is positioned between fluid flow restrictor 240 and valve 260 and thereby indicates this pressure drop during clutch filling. Fluid flow restrictor 240 is shown here as an adjustable orifice, however, a fixed flow restrictor or a flow restrictor in combination with a modulator can alternatively be used.

Processor 200 controls the opening and closing of valve 260 by producing a valve opening and a valve closing signal that are communicated to valve 260. Processor 200 receives pressure signals generated by pressure transducer 250, engine signals generated by sensors 280, and shift initiation signals generated by shift initiator 170. Finally, processor 200 is adapted to provide a time value representative of the time delay between valve closing on an off-going clutch and valve opening of an on-coming clutch. As will be further discussed, by providing the proper timing between on-coming and off-going clutches, smooth shifts are advantageously achieved.

In the exemplary embodiment, processor 200 is a microprocessor-based digital controller, such as an Intel 80C198 microcontroller and associated control circuitry having appropriate valve drivers and signal conditioning, configured by coded instructions embedded in the processor or the accompanying memory circuit 210. One or more other processors known to those skilled in the art may be employed in place of processor 200. A general flowchart of such coded instructions for choosing clutch sequence timing are provided in FIGS. 11 and 12, discussed below.

In addition to the aforementioned elements, intermediate driver circuits between controller 190 and valve 260, between controller 190 and pressure transducer 250, between controller 190 and sensors 280, and between controller 190 and initiator 170 may be employed, as necessary, to amplify or condition respective signals. Such driver circuits are known to those skilled in the art.

2. Operation of the Individual Clutch

Figure 2:
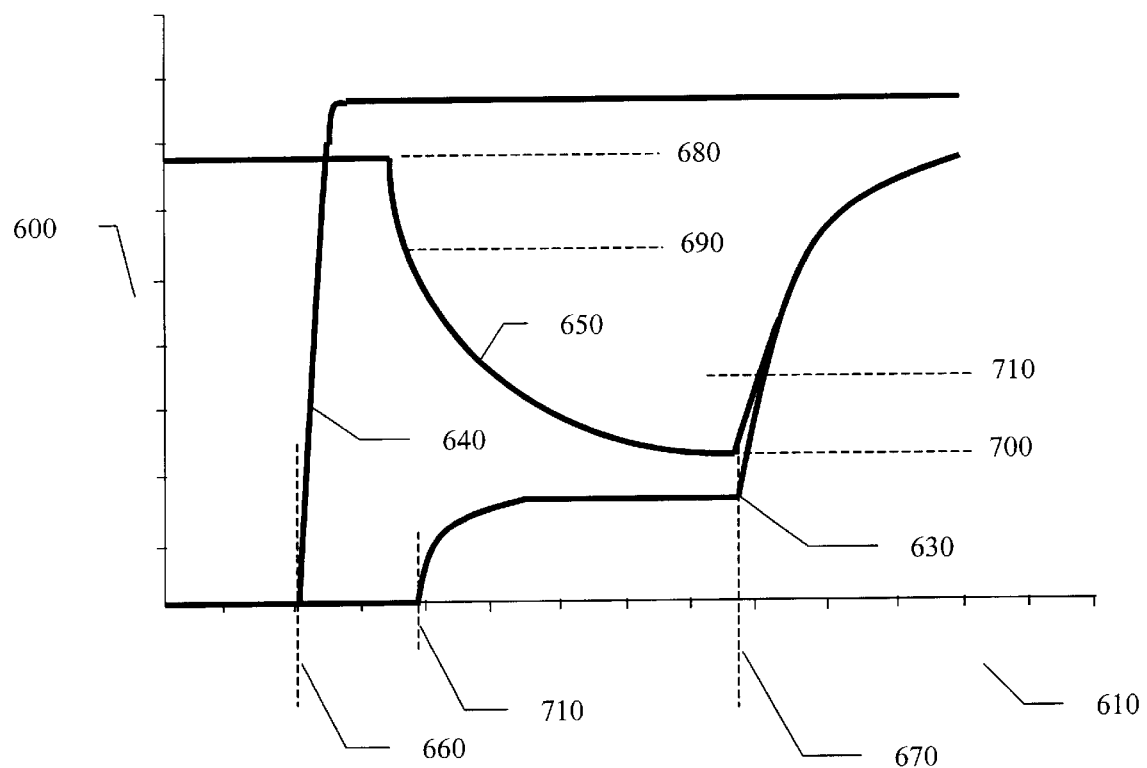
FIG. 2 is a timing diagram showing hydraulic pressure during engagement of an on-coming clutch along with hydraulic pressure of a manifold.

To illustrate the timing involved with engaging and disengaging clutch 270 of FIG. 1, several hydraulic pressure curves related to clutch timing are shown in FIGS. 2 through 5. FIG. 2 shows the valve current, clutch pressure, and manifold pressure waveforms for an engaging clutch. Waveforms are presented on a graph as a function of pressure and current 600 and time 610. It should be noted that the pressure values are a function of the clutch piston area and the force of the return spring pushing the piston. Curve 650 indicates the pressure at pressure transducer 250 of FIG. 1. Curve 630 indicates the pressure in clutch 270. Curve 640 indicates the current flowing through the coil of valve 260, which is an indirect indicator of the energization of valve 260.

Controller 190 signals valve 260 to open and conduct fluid to the clutch at time $t_0$, indicated by dashed line 660. The current through the coil subsequently increases, and valve 260 opens. There is a delay between the time current is applied to the coil, to indicated by dashed line 660, and the time valve 260 opens, $t_x$ indicated by dashed line 710. As valve 260 opens at time $t_x$, transducer pressure drops from system pressure $P_{sys}$ (indicated by dashed line 680) to lower pressure $P_{droop}$ (indicated by dashed line 690), indicating that fluid is flowing into the clutch. As the pressure at the transducer drops, pressure in the clutch (indicated by curve 630) rises as the clutch fills. The transducer pressure (curve 650) continues dropping, although at a slower rate as the clutch fills and the clutch plates move toward engagement.

Finally, a lowermost pressure value is reached (indicated by dashed line 700), and transducer pressure begins to rise rapidly. This is the time or range of incipient clutch engagement, $t_1$ indicated by dashed line 670. At time $t_1$, the clutch is full of fluid and the clutch pressure begins to build up to system pressure. Above the pressure noted by dashed line 700, the clutch begins transmitting torque. Prior to time $t_1$, the clutch is not transmitting torque. Of note, the time difference between $t_1$ and $t_0$ is referred to as clutch fill time. The clutch fill time is the amount of time required to fill the engaging clutch and is measured from the time that the clutch valve is electrically turned on, $t_0$, until the time that the clutch has filled and is transmitting torque, $t_1$. Each clutch has its own fill time.

Figure 3:
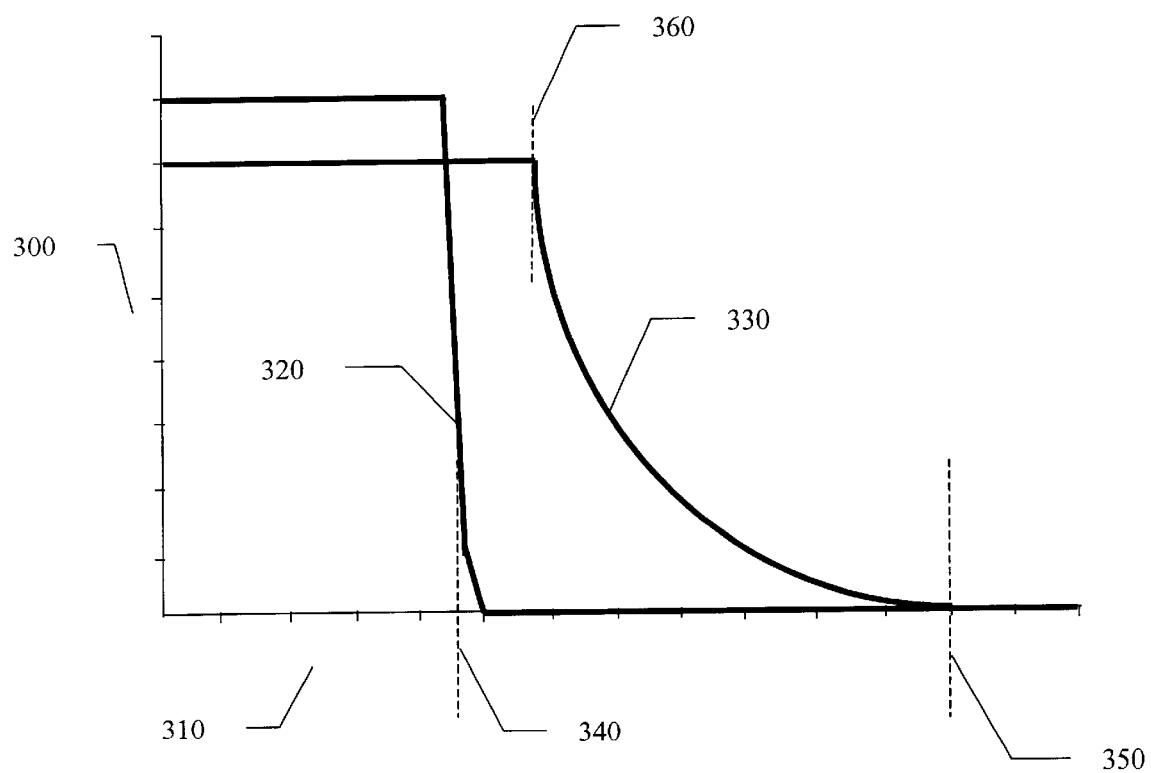
FIG. 3 is a timing diagram showing hydraulic pressure during disengagement during an off-going clutch.

Next, FIG. 3 shows the valve current and clutch pressure waveforms for a disengaging or off-going clutch. Waveforms are presented on a graph as a function of pressure and current 300 and time 310. Curve 330 indicates the pressure in the clutch. Curve 320 indicates the current flowing through the coil of valve 260, which is an indirect indicator of the energization of valve 260. Once the valve current is turned off at time $t_o$, indicated by dashed line 340, there is a delay before the valve responds at time $t_x$ (indicated by dashed line 360). After this delay time, the clutch pressure then falls to sump pressure. Finally, the clutch is sufficiently evacuated such that it is no longer delivering torque at time $t_1$ (indicated by dashed line 350). The time difference between $t_1$ and $t_0$ is clutch overlap time. Clutch overlap time is the amount of time required to exhaust the disengaging clutch and is measured from the time that the disengaging clutch valve is electrically turned off, to indicated as dashed line 340, until the time that the clutch is no longer transmitting torque, $t_1$ indicated by dashed line 350. Similar to fill time, each clutch has its own overlap time.

Figure 4:
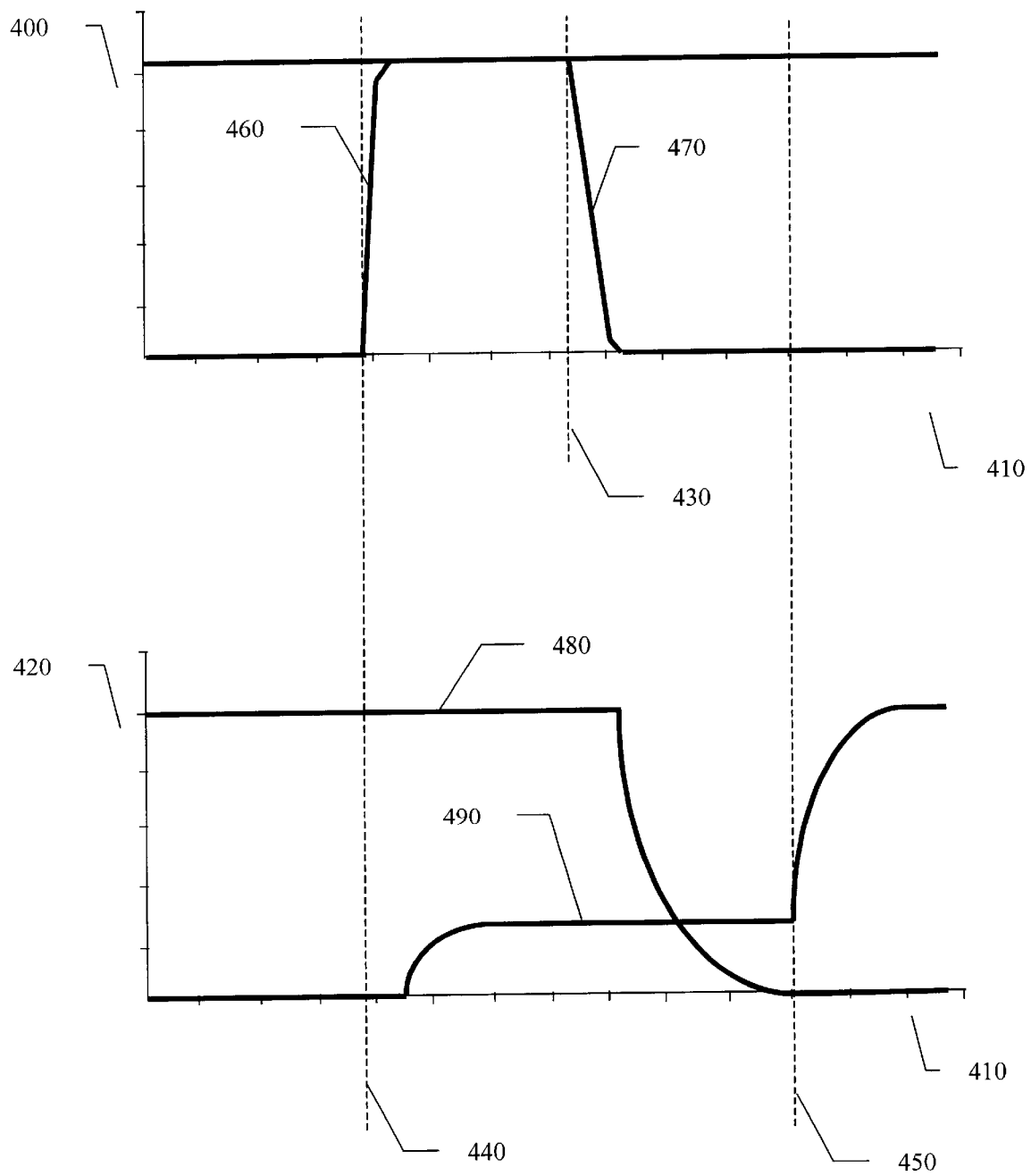
FIG. 4 is a timing diagram of an "open" shift.

Next, FIG. 4 shows a shift where the engaging or on-coming clutch just begins to carry torque as the disengaging clutch reaches sump pressure. Waveforms are presented on a graph as a function of pressure 420, current 400 and time 410. Curve 460 indicates the current flowing through the coil of the valve associated with the engaging clutch. Alternatively, curve 470 indicates the current flowing through the coil of the valve associated with the disengaging clutch. Curve 480 indicates the pressure in the disengaging clutch and curve 490 indicates the pressure in the engaging clutch.

As described in relation to FIG. 2, the fill time shown on FIG. 4 of the engaging clutch is the time difference between the turn on time $t_a$, indicated by dashed line 440, and critical time $t_{a+2}$, indicated by dashed line 450. As described in relation to FIG. 3, the overlap time shown on FIG. 4 of the disengaging clutch is the time difference between the turn off time, $t_{a+1}$ indicated by dashed line 430, and critical time $t_{a+2}$ indicated by dashed line 450.

Where the disengaging clutch drops the torque before the engaging clutch picks up the torque, a torque hole exists. This is commonly referred to as an "open" shift. It is often desirable to close this torque hole by turning on the engaging clutch earlier so that it begins to carry torque before the disengaging clutch has reached sump pressure. This is particularly true during an upshift where there is no complete drivetrain. However, during a downshift, it is actually good to have a small torque hole to slow down the tractor during shift. Advantageously, the exemplary embodiment is operable to sequence the turn on time $t_a$, indicated by dashed line 440, with the turn off time $t_{a+1}$, indicated by dashed line 430, such that the disengaging clutch ceases to carry torque and the engaging clutch begins to carry torque at the critical time $t_{a+2}$, indicated by dashed line 450. This sequencing advantageously eliminates the torque hole during upshift and controls the torque hole during downshift.

The amount of time that the engaging clutch is turned on ahead of the disengaging clutch is termed OFFSET. Referring to FIG. 4, OFFSET is illustrated as the difference between time $t_a$, indicated by dashed line 440, and time $t_{a+i}$, indicated by dashed line 430. The amount of OFFSET required to obtain a smooth shift is a function of the load on the transmission (i.e., vehicle load). Advantageously, as described further below, the exemplary embodiment is operable to adjust OFFSET to account for variations in load. It is notable that fill time and overlap time are not adjusted with load.

Figure 5:
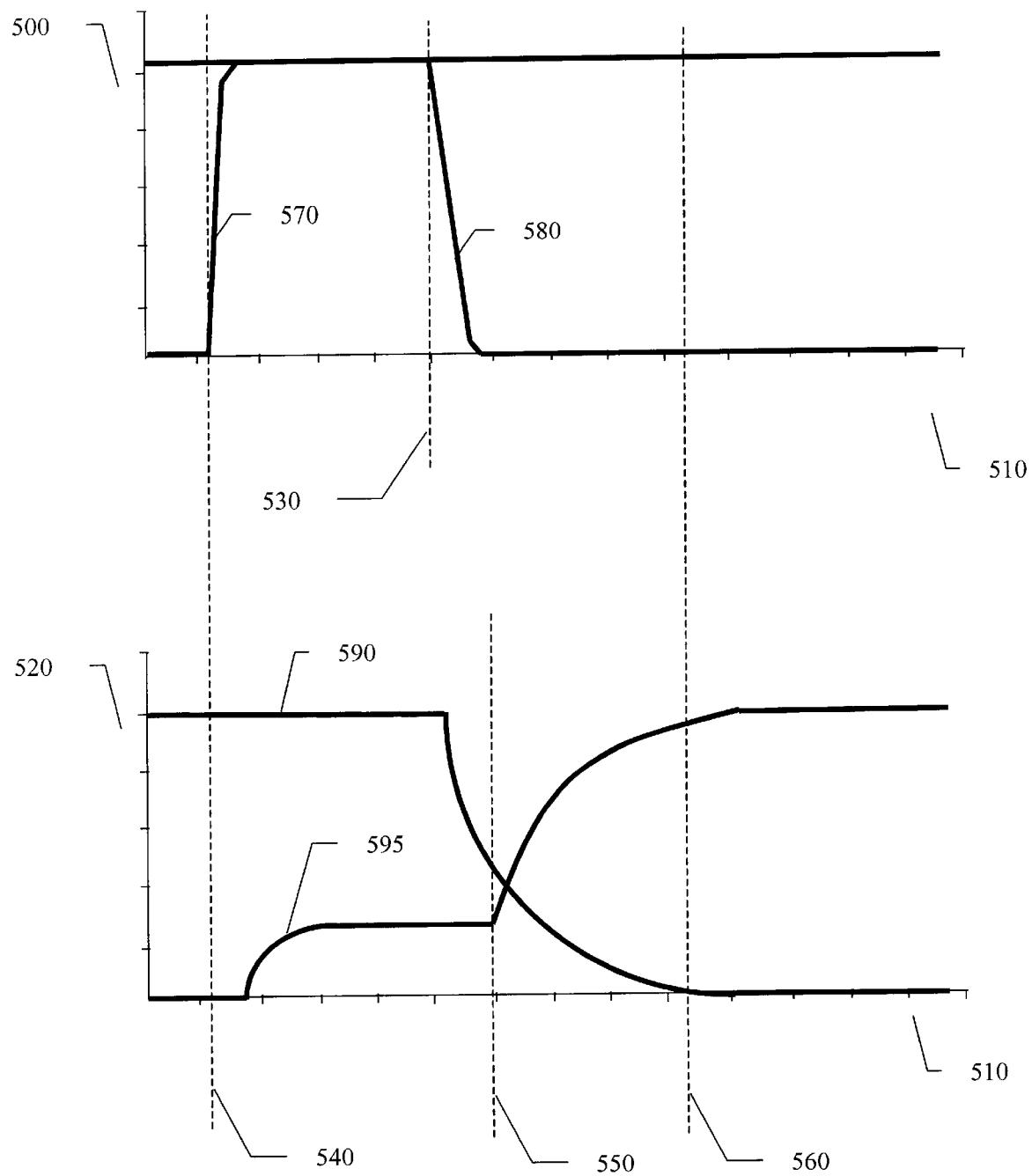
FIG. 5 is a timing diagram of an "overlapped" shift.

In contrast to an open shift is an overlapped shift. In an overlapped shift, the engaging clutch begins to carry torque before the disengaging clutch reaches sump pressure. FIG. 5 illustrates an overlapped shift. Waveforms are presented on a graph as a function of pressure 520, current 500 and time 510. Curve 570 indicates the current flowing through the coil of the valve associated with the engaging clutch. Alternatively, curve 580 indicates the current flowing through the coil of the valve associated with the disengaging clutch. Curve 590 indicates the pressure in the disengaging clutch and curve 595 indicates the pressure in the engaging clutch.

As described in relation to FIG. 2, the fill time shown on FIG. 5 of the engaging clutch is the time difference between the turn on time $t_a$, indicated by dashed line 540, and engaging time $t_{a+2}$, indicated by dashed line 550. As described in relation to FIG. 3, the overlap time shown on FIG. 5 of the disengaging clutch is the time difference between the turn off time $t_{a+1}$, indicated by dashed line 530, and critical time $t_{a+2}$, indicated by dashed line 560.

Where the disengaging clutch maintains torque when the engaging clutch picks up the torque, a torque overlap exists. It is desirable to avoid this torque overlap by turning off the disengaging clutch earlier so that it ceases to carry torque before the engaging clutch picks up torque. Advantageously, the exemplary embodiment is operable to sequence the turn on time $t_a$, indicated by dashed line 540, with the turn off time $t_{a+1}$, indicated by dashed line 530, such that the disengaging clutch ceases to carry torque and the engaging clutch begins to carry torque at the same critical time. This sequencing advantageously eliminates the torque overlap.

Again, the amount of time that the engaging clutch is turned on ahead of the disengaging clutch is termed OFFSET. Similar to that shown in FIG. 4, in FIG. 5, OFFSET is illustrated as the difference between time $t_{a+1}$, indicated by dashed line 550, and time $t_{a+2}$, indicated by dashed line 560. The amount of OFFSET required to obtain a smooth shift is a function of the load on the transmission (i.e., vehicle load). Advantageously, as described further below, the exemplary embodiment is operable to adjust OFFSET to account for variations in load. Again, it is notable that fill time and overlap time are not adjusted with load.

In some situations, it may be desirable to disengage the off-going clutch before or at the same time as engaging the on-coming clutch.

3. Clutch Fill Time and Calibration

While fill time and overlap time are not adjusted as a function of load, in one particularly advantageous embodiment of the exemplary embodiment, fill time is automatically adjusted every time a clutch is filled. As the fill time changes based upon clutch hydraulic pressure, it is necessary to continually determine the fill time. Determination of fill time is accomplished using the following algorithm described in relation to FIGS. 1 and 2.

Referring again to FIG. 2, the fill time is defined as the time period between time $t_0$, indicated by dashed line 660, and time $t_1$, indicated by dashed line 670. The calibration routine determines fill time by monitoring manifold pressure, indicated by curve 650. More specifically, when the valve controlling fluid to the engaging clutch is open, manifold pressure 650 droops because there is hydraulic flow through the manifold into the clutch. This droop begins at time $t_x$, indicated by dashed line 710. At time $t_1$, indicated by dashed line 670, manifold pressure 650 begins to increase since fluid flow into the clutch has stopped. It should be recognized that manifold pressure 650 and clutch pressure 630 both increase once the clutch is filled. With the clutch filled with fluid, the clutch begins to engage. Thus, by monitoring the fluid pressure in either the clutch (curve 630) or in the manifold (curve 650), fill time can be determined. One particularly advantageous embodiment of the exemplary embodiment utilizes manifold pressure 650, instead of clutch pressure 630, because a single pressure transducer can be used for all clutches associated with the manifold. The method utilizing only a single pressure transducer assumes that only one clutch is engaging at a given time.

Figure 6:
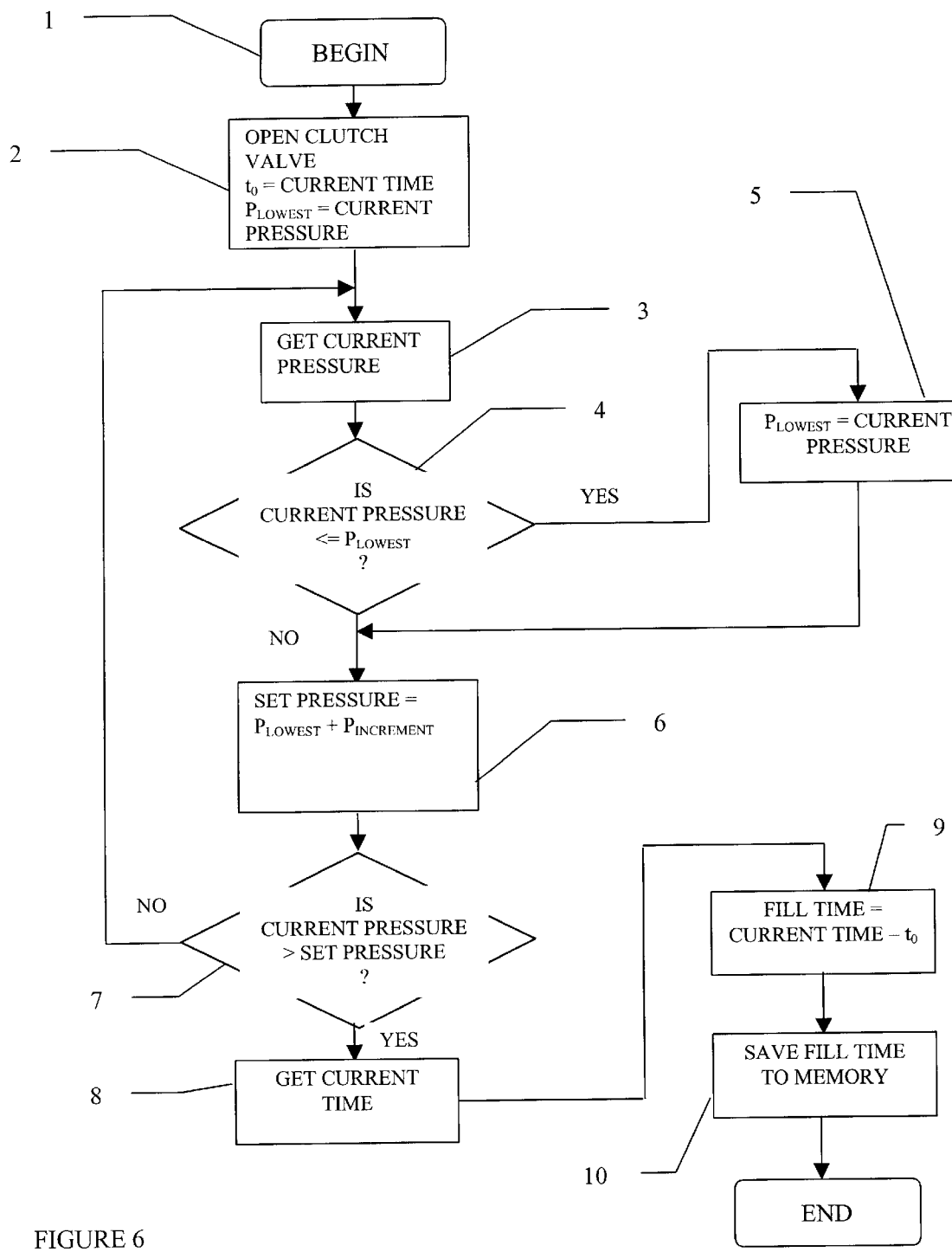
FIG. 6 is a flow diagram of fill time calibration.

The calibration procedure is described in relation to the flowchart of FIG. 6. In step 1, processor 200 receives a shift indication from shift initiator 170. At step 2 processor 200 signals valve 260 to open and admit hydraulic fluid to clutch 270, saves the current transducer reading as the variable $P_{LOWEST}$ and saves a value indicative of the current time as variable to. At step 3, the processor 200 enters a pressure reading loop, wherein it reads pressure values, compares the retrieved pressure reading against $P_{LOWEST}$ (step 4), and if the current pressure reading is lower than $P_{LOWEST}$, saves the current pressure reading (step 5) as $P_{LOWEST}$ and proceeds to step 6 to continue execution. If the pressure reading (step 3) is greater than the previously saved pressure reading, as determined at step 4, this indicates that the minimum pressure (indicated as dashed line 700 of FIG. 2) has been reached, and the hydraulic pressure measured at the transducer 250 is now recovering and execution continues at step 6. If manifold pressure (curve 650 of FIG. 2) fails to droop less than a predetermined incremental level, indicated by dashed line 690 of FIG. 2, below system pressure, indicated by dashed line 680 of FIG. 2, within a predetermined time interval after time $t_0$, then a "failure to calibrate fill time" is indicated for that clutch. If there is a failure to calibrate, the fill time for that clutch is not updated, but the shift in progress is not aborted. If a clutch slip is detected after the shift, then that clutch is assumed to have failed to engage, otherwise, the pressure sensor is assumed to have failed.

In step 6, processor 200 calculates pressure value, SET PRESSURE, by adding $P_{INCREMENT}$, illustrated in FIG. 2 as the difference between dashed lines 710 and 700, to $P_{LOWEST}$. Also in step 6, the result is stored as SET PRESSURE in memory. $P_{INCREMENT}$ can be a predefined value previously stored in memory and retrieved by the processor, or it may be calculated.

From step 6, the processor compares the current pressure reading to the value of SET PRESSURE. If the current pressure reading is not greater than the value of SET PRESSURE, the processor returns from step 7 to step 3 and repeats the sequence of steps described above. Once the current pressure reading exceeds the value of SET PRESSURE at step 7, the processor proceeds to step 8 and again reads the current time. Note that the small additional time introduced by waiting for the manifold pressure to rise from the lowest manifold pressure (dashed line 700 of FIG. 2) to the incremental pressure (dashed line 710 of FIG. 2) is included in fill time.

In step 9, processor 200 then calculates the time interval between valve energization and incipient clutch engagement, and saves this value to memory (step 10) as the clutch fill time. The fill time is stored in non-volatile memory 210 and is made available for the next time the clutch is engaged.

The fill time calibration described above provides several advantages. First, several clutches can be calibrated using a single pressure transducer 250. Second, the method is not sensitive to system pressure changes or minimum manifold pressure since an incremental change rather than an absolute pressure level is sensed. Third, the fill time is calculated during normal vehicle operation and each time the clutch is engaged. Fourth, the use of non-volatile memory for storing fill times means the fill times do not need to be re-learned each time power is applied. This is important as the fill time being calibrated has no effect on the shift in progress, it can only be used at the next clutch engagement. Fifth, the method is adaptive. As oil temperature changes and the clutch faces wear, the fill times are automatically adjusted with each engagement.

The calibration method can be made more robust by utilization of various refinements. For example, the signal indicating manifold pressure coming from transducer 250 can be low pass filtered to reject high frequency noise that may induce false minimum pressure signals. However, excessive filtering should be avoided as it causes undesirable time lag in the signal, leading to miscalculation of fill time.

Additionally, the fill times for each clutch are calculated for each type of shift. This is advantageous because different combinations of clutch engagements places different loads on the hydraulic system. Thus, an individual clutch will have a different fill time depending on what other clutches are also being engaged. Specifically, a shift from $3^{rd}$ to $4^{th}$ will result in a different fill time than a shift from $9^{th}$ to $8^{th}$ when the same specific clutch is involved. A table of fill times for each clutch can be maintained. The table would include fill time information related to the specific clutch engaged in a particular up or downshift.

Another refinement is related to oil temperature. As oil temperature has a large influence on fill time, and oil temperature changes significantly from the last engagement before the vehicle is turned off until the initial engagement when the vehicle is turned on, a refinement can be made to account for this change in oil temperature. To improve this situation, fill time tables calibrated at a range of oil temperatures can be maintained. The appropriate table for the current oil temperature can be utilized at power up of the vehicle as the initial starting point for fill times.

4. Operation of the Powershift Transmission

In the exemplary embodiment, processor 200 is coupled to additional clutches in a manner similar to that shown in FIG. 1 and the accompanying text. More specifically, clutch 270 and valve 260 are repeated for each additional clutch in the system. With multiple clutches in the system, processor 200 must disengage the additional clutches not required for the gear ratio to which the vehicle is to be shifted. In the exemplary embodiment, disengagement of off-going clutches is scheduled by a fixed sequencing table stored in memory. In general, the data maintained in the sequencing table is used to sequence on-coming clutches with off-going clutches. By thus synchronizing clutch engagement and disengagement, processor 200 prevents torque holes (open shift) or transmission lock-up (overlapping shift). Such a transmission is described below with regard to FIG. 7.

Figure 7:
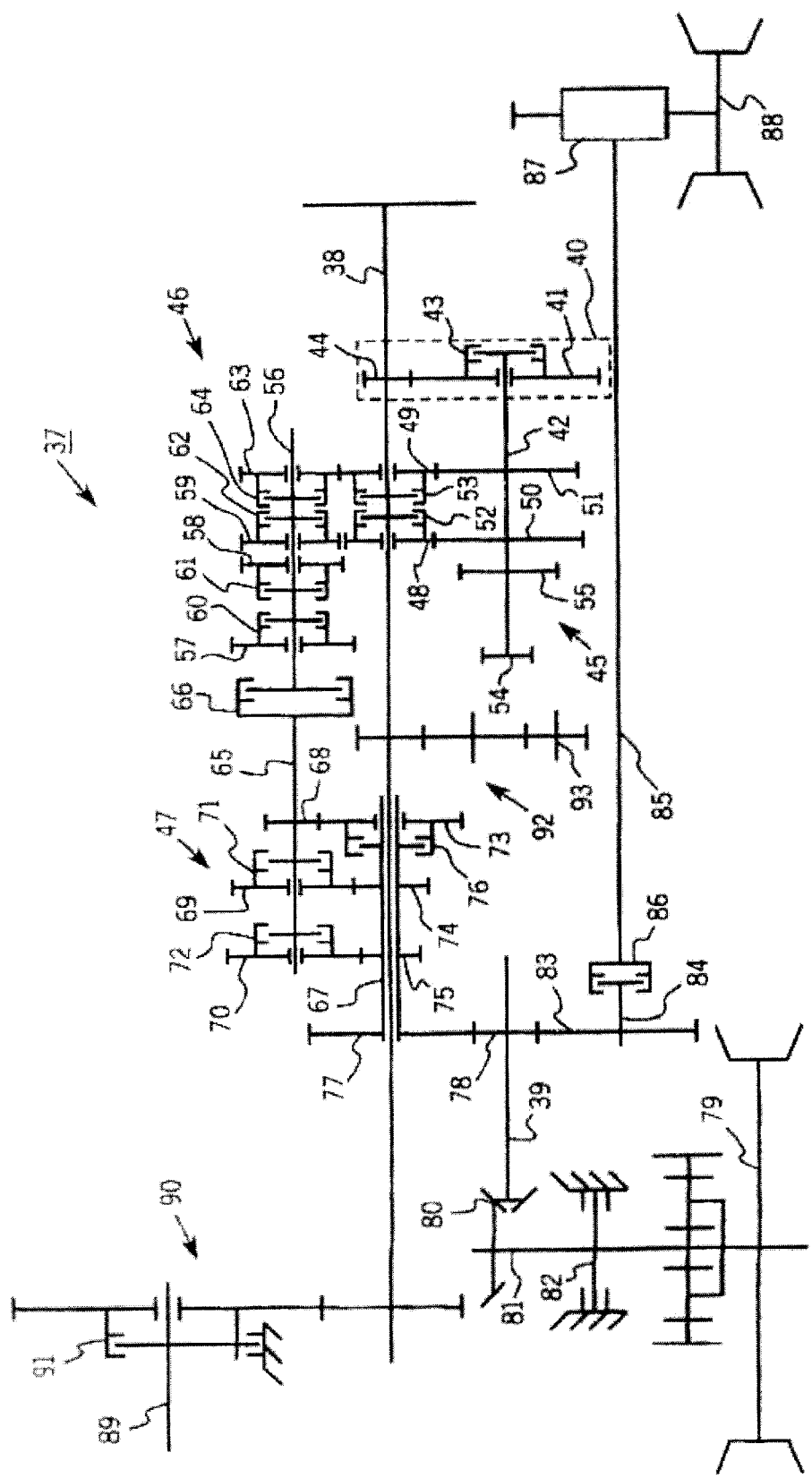
FIG. 7 is a schematic diagram of clutches in a powershift transmission.

An exemplary multiple clutch powershift transmission for use with hydraulic clutches calibrated as described herein is illustrated in FIG. 7. This transmission is typical of transmissions employed for work vehicles having a plurality of forward and reverse gears, capable of power shifting between forward or reverse gears.

Turning more particularly to the structure and operation of transmission 37, while any one of a variety of transmissions may be controlled, such as the transmissions in the Case IH STX Series Steiger tractors, manufactured by Case Corp., Racine, Wis. FIG. 7 diagrammatically illustrates one exemplary configuration. Transmission 37 is of a type known generally as a "powershift transmission", wherein several sets of gears are associated with transmission shafts and certain of the gears may be selectively rotationally fixed with respect to their shafts by engagement of an associated fluid clutch to define desired gear ratios between input shaft 38 and output shaft 39. In the transmission illustrated in FIG. 7, input shaft 38 is driven in rotation by the vehicle engine. Gear sets, along with associated fluid clutches and transmission shafts, permit a number of different gear ratio combinations to be defined for driving transmission output shaft 39 at desired speeds as follows.

A creeper gear set 40 includes a creeper gear 41 mounted on and rotational with respect to a second transmission shaft 42. A creeper clutch 43 is engageable to lock creeper gear 41 against rotation on shaft 42. Creeper gear set 40 also includes a gear 44 fixed to shaft 38 and continuously meshing with creeper gear 41. Engagement of creeper clutch 43 results in driving shaft 42 through gears 44 and 41 to obtain an extremely slow output speed of shaft 39. Creeper gear set 40 may be optionally excluded from transmission 37.

Transmission 37 includes three groups of gear sets, identified in FIG. 7 by the reference numerals 45, 46 and 47. First group 45 includes first and second gears 48 and 49 supported on and rotational with respect to shaft 38. Additional gears 50 and 51, fixed on second shaft 42 mesh continuously with gears 48 and 49, respectively. Fluid clutches 52 and 53 are associated with gears 48 and 49, respectively, and may be engaged to lock their associated gear against rotation on shaft 38. In operation, either clutch 52 or clutch 53 is engaged to obtain an input-to-output gear ratio, or both clutches may be released or disengaged to interrupt the transmission of power to shaft 42. In the exemplary embodiment shown, gear combination 48 and 50 define a ratio 34:39, while gears 49 and 51 have a ratio of 37:37.

Second gear set group 46 includes gear 50, as well as to additional gears 54 and 55, all fixed on second shaft 42. Supported on a third transmission shaft 56 and rotational with respect to third shaft 56, three gears 57, 58 and 59 mesh continuously with gears 54, 55 and 50, respectively (actual meshing is not shown in FIG. 7). Fluid clutches 60, 61 and 62 are associated with gears 57, 58 and 59, respectively, and may be engaged to lock the associated gear against rotation on shaft 56. Thus, either one of clutches 60, 61 or 62 may be engaged to transmit power between second shaft 42 and third shaft 56, or all of the clutches may be released to interrupt power transmission between the shafts. In the exemplary embodiment illustrated, gear combination 54 and 57 provide a gear ratio of 29:44, combination 55 and 58 provide a ratio of 34:39, and combination 50 and 59 provide a ratio of 39:34.

A reverse gear set is provided adjacent to second gear set group 46 on shaft 56, and includes a reverse gear 63 mounted on and rotational about shaft 56. A reverse clutch 64 is associated with reverse gear 63 and may be engaged to lock reverse gear against rotation with respect to shaft 56, placing transmission 37 in one of several reverse gear ratios.

Third shaft 56 is aligned with and may be selectively coupled to a fourth transmission shaft 65 via a master clutch 66. Thus, when master clutch 66 is fully engaged, shaft 65 rotates at the same speed and in the same direction as shaft 56. As discussed below, master clutch 66 is preferably modulated into and out of engagement, such as by pulse-width-modulating a proportional directional control valve. However, master clutch 66 may be mechanically or electro-mechanically modulated by techniques well known in the art.

Third gear set group 47 selective couples shaft 65 with a further shaft 67 disposed about shaft 38. Third gear set group 47 includes a first gear 68 fixed to shaft 65, and a pair of gears 69 and 70 supported on and rotational with respect to shaft 65. Clutches 71 and 72 are associated with gears 69 and 70, respectively, and may be engaged to lock the associated gear against rotation on shaft 65. Gears 68, 69 and 70 mesh continuously with corresponding gears 73, 74 and 75, respectively, on shaft 67. Gear 73 is supported on and rotational with respect to shaft 67, whereas gears 74 and 75 are fixed to shaft 67. A fluid clutch 76 is associated with gear 73 and may be engaged to lock gear 73 against rotation on shaft 67. Thus, by selectively engaging either clutch 71, 72 or 76, shaft 67 is caused to rotate at a predetermined speed ratio as shaft 65 is driven in rotation. In the exemplary embodiment, gear combination 68 and 73 provide a gear ratio of 22:54, combination 69 and 74 provide a ratio of 37:39, and combination 70 and 75 provide a ratio of 52:24.

Shaft 67 transmits power to transmission output shaft 39 through gears 77 and 78, fixed on shafts 67 and 39 respectively and arranged to continuously mesh with one another. As illustrated in FIG. 7, output shaft 39 transmits power to rear axle 79 through bevel gears 80 arranged to drive a differential input shaft 81. A master brake 82 is provided on shaft 81 for braking vehicle 10. In addition to driving rear axle 79, in the exemplary embodiment illustrated in FIG. 7, gear 78 carried by output shaft 39 meshes with a further gear 83 supported on a front wheel drive clutch shaft 84. A front wheel drive shaft 85 may be selectively coupled to clutch shaft 84 by front wheel drive clutch 86, and extends to front wheel drive differential 87 for driving front axle 88.

In addition to the gearing described above, transmission 37 is preferably arranged for driving power take off shaft 89 via power take off gearing 90, including power take off clutch 91. Transmission 37 also includes gearing, designated generally by the reference numeral 92, for driving a hydraulic pump drive shaft 93.

The clutches contained in transmission 37 are preferably fluid clutches of a type known in the art. Such clutches are typically biased in a disengaged position and engageable by the application of pressurized fluid. Clutches 52, 53, 60, 61, 62, 64, 71, 72 and 76 in the exemplary embodiment are engaged by hydraulic valves that are either on or off, and are operated by shifting them directly between pressure transmitting ("on") and pressure relieving ("off") positions. Such valves have a single engagement flow rate, and thus a single clutch fill time calibration value. Proportional hydraulic valves, for example, may also be employed in transmission 37. These valves are unlike on/off valves, in that proportional hydraulic valves provide a plurality of flow rates, and thus fill times. The plurality of flow rates are provided by modulating the valves into and out of engagement. For such valves, flow rate magnitude is a function of the input signal magnitude. In other words, for input signals of different magnitudes, a proportional hydraulic valve will provide different flow rates (and thus different clutch fill times). Such valves can therefore be calibrated according to the exemplary embodiment, but the fill rate calibration will be a function of the input signal applied to such valve. The valve supplying master clutch 66 is an exception to the above. To permit smooth transitions in shifting, master clutch 66 is preferably modulated into and out of engagement by pulse width modulating a proportional directional control valve coupled to master clutch 66. This is especially important when the work vehicle is stopped and the operator is shifting from neutral into a forward or reverse gear.

Several modes of shifting are possible with transmission 37. "Power shifting", e.g. direct shifting between selected gears when the vehicle is already engaged and moving in a particular direction without operating master clutch 66 may be performed by disengaging outgoing clutches (corresponding to the gear ratio being shifted from) while engaging incoming clutches (for the gear ratio being shifted to), in a coordinated and timed manner. "Skip shifting" is the technique of shifting between two different gear ratios, while skipping intermediate gear ratios. "Modulated shifting" is the technique of disengaging master clutch 66, disengaging the current gear ratio, engaging a desired gear ratio, then modulating the engagement of master clutch 66. Such modulated shifting is extremely useful in certain shifting situations, such as starting from a stop and shuttle shifting between forward and reverse gear ratios.

By engaging combinations of clutches, transmission 37 establishes a number of predetermined gear ratios between input shaft 38 and output shaft 39. In particular, for the transmission illustrated in FIG. 7, the following gear ratios are provided (the prefixes F, R, C and CR representing forward, reverse, forward creeper and reverse creeper gear ratios, respectively) that are numbered here in order of increasing gear ratios:

TABLE 1

| Gear ratio | Clutches engaged |
|---|---|
| F1 | 52, 60, 76 |
| F2 | 53, 60, 76; |
| F3 | 52, 60, 76; |
| F4 | 53, 61, 76; |
| F5 | 52, 61, 76; |
| F6 | 53, 62, 76; |
| F7 | 52, 60, 71; |
| F8 | 53, 60, 71; |
| F9 | 52, 61, 71; |
| F10 | 53, 61, 71; |
| F11 | 52, 62, 71; |
| F12 | 53, 62, 71; |
| F13 | 52, 60, 72; |
| F14 | 53, 60, 72; |
| F15 | 52, 61, 72; |
| F16 | 53, 61, 72; |
| F17 | 52, 62, 72; |
| F18 | 53, 62, 72; |
| R1 | 52, 64, 76; |
| R2 | 53, 64, 76; |
| R3 | 52, 64, 71; |
| R4 | 53, 64, 71; |
| C1 | 43, 60, 76; |
| C2 | 43, 61, 76; |
| C3 | 43, 62, 76; |
| C4 | 43, 60, 71; |
| C5 | 43, 61, 71; |
| C6 | 43, 62, 71; |
| CR1 | 43, 64, 76; |
| CR2 | 43, 64, 71. |

Each column in the above chart identifies a group of clutches required to engage the transmission in any gear ratio. The first group (first column) includes clutches 52, 53, and 43. The second group (second column) includes clutches 60, 61, 62, and 64. The third group (third column) includes clutches 71, 72, and 76. Furthermore, for forward gear ratios, only one clutch of each gear set group 45, 46, 47 is engaged. Similarly, for reverse gear ratios, the reverse gear clutch 64 is engaged along with a clutch from the first and third gear set groups 45 and 47. Moreover, for creeper gear ratios, the creeper clutch 43 is engaged along with a clutch from the second gear set group 46 (or the reverse gear clutch 64) and a clutch from the third gear set group 47. For transmission of power through transmission 37, all the gear combinations require the engagement of master clutch 66.

Transmission 37 has thirteen clutches. As indicated by the TABLE 1 above, in order to provide a plurality of forward and reverse gear ratios, several clutches must be simultaneously engaged. Each of the clutches providing forward and reverse gear ratios shown in TABLE 1 may be operated during power shifting, and thus should be calibrated regularly. To provide for calibration of these clutches, pressure sensors and flow restrictors are provided as shown in FIG. 8.

Figure 8:
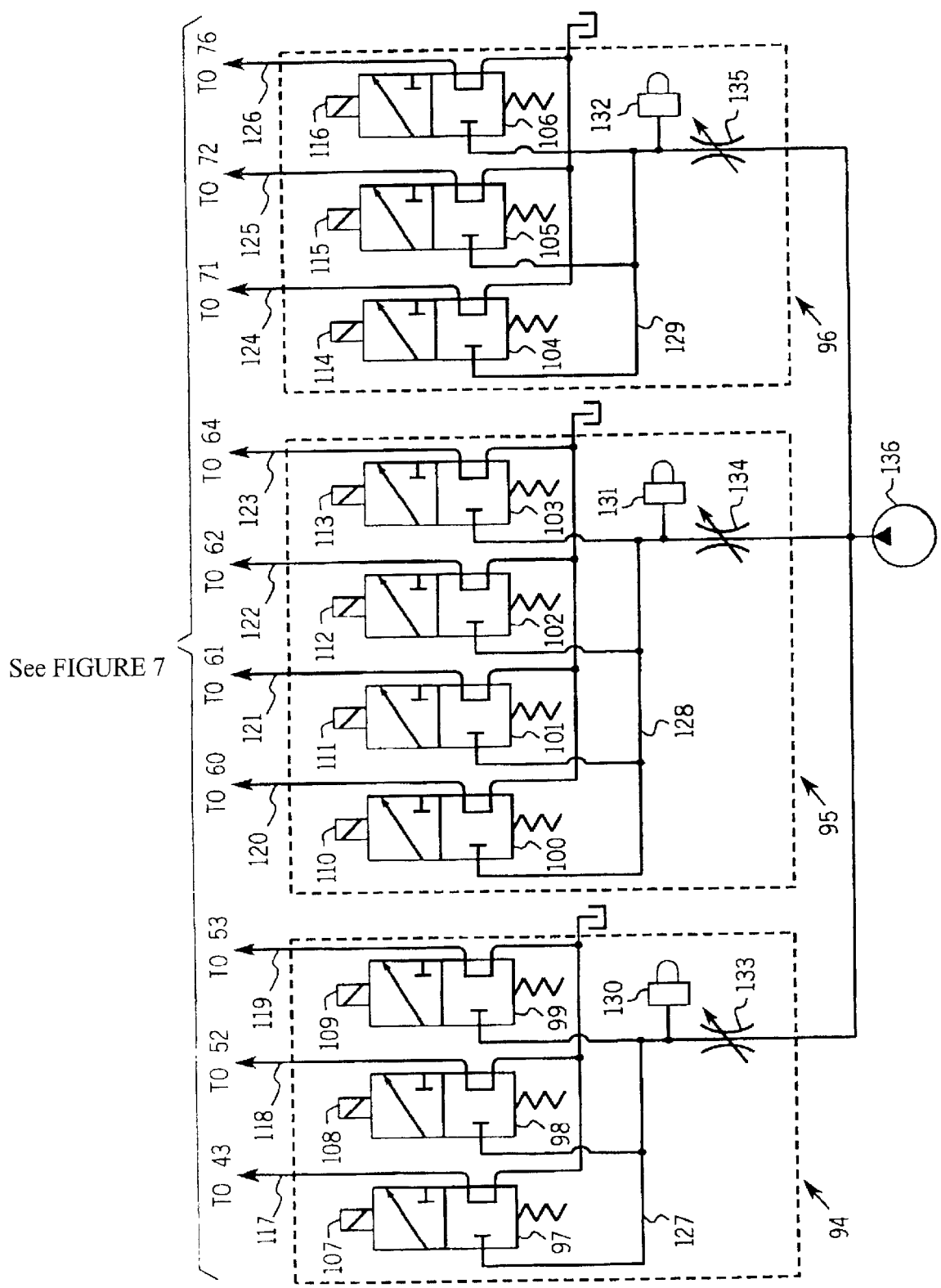
FIG. 8 is a schematic diagram of clutch valves in a powershift transmission.

FIG. 8 illustrates such a valve body arrangement for the valves associated with the three groups of clutches. Three valve bodies 94–96, include ten clutch valves 97–106, having valve solenoids 107–116 and output lines 117–126, respectively. Clutch valves 97–106 control clutches 43, 52, 53, 60, 61, 62, 64, 71, 72, and 76, respectively, by regulating the flow of hydraulic fluid to the clutches through output lines 117–126. The hydraulic supply sides of clutch valves 97–99, clutch valves 100–103, and clutch valves 104–106 are joined to common manifolds 127–129, respectively. Pressure transducers 130–132 are also coupled to the valve bodies and are adapted to sense pressure in manifolds 127–129, respectively. Flow restrictors 133–135 are joined to manifolds 127–129, respectively, and to hydraulic supply 136.

The clutch valves for the clutches in the first column of TABLE 1 are arranged in valve body 94. The clutch valves for the clutches in the second column of TABLE 1 are arranged in valve body 95. The clutch valves for the clutches in the third column of TABLE 1 are arranged in valve body 96. For any of the gear ratios disclosed in TABLE 1, only one clutch in each group need be engaged simultaneously. Therefore, only one clutch valve in each of the valve bodies need be energized simultaneously to perform any shift. Therefore, the pressure transducers on each valve body are capable of calibrating the fill times of every clutch during every shift, since the pressure drop measured by each pressure transducer during any clutch engagement will be a function of the fill time of a single clutch. By sensing pressure changes at the inlet side of the clutch valves, rather than the pressure at each clutch, the number of pressure transducers required to calibrate the clutches can be reduced.

To engage the clutches, the appropriate solenoids are energized, opening a passage between the inlet side of the valves and the output lines, thereby allowing the passage of hydraulic fluid to the clutches. The fluid passes from the hydraulic supply, through the flow restrictors, into the manifolds, through the valves, through the output lines and into the clutches. The pressure transducers are positioned to provide a signal indicative of the pressure in their respective manifolds.

Valves 97–106 are preferably solenoid valves, having an "on" position, in which the valves are completely open, allowing flow from the hydraulic supply to their respective clutches, and an "off" position in which their respective output lines are disconnected from manifold 95 and are coupled to a tank. Moreover, valves 97–106 preferably include reverse flow preventing check valves as indicated schematically in FIG. 8 for preventing pressure from being relieved from the clutches in the event pressure supply to a valve falls temporarily when the valve is in its energized state. Flow restrictors 133–135 may be orifices, as shown here. More preferably, the flow restrictor is a modulator of the type disclosed in FIG. 10 and the accompanying text.

Figure 9:
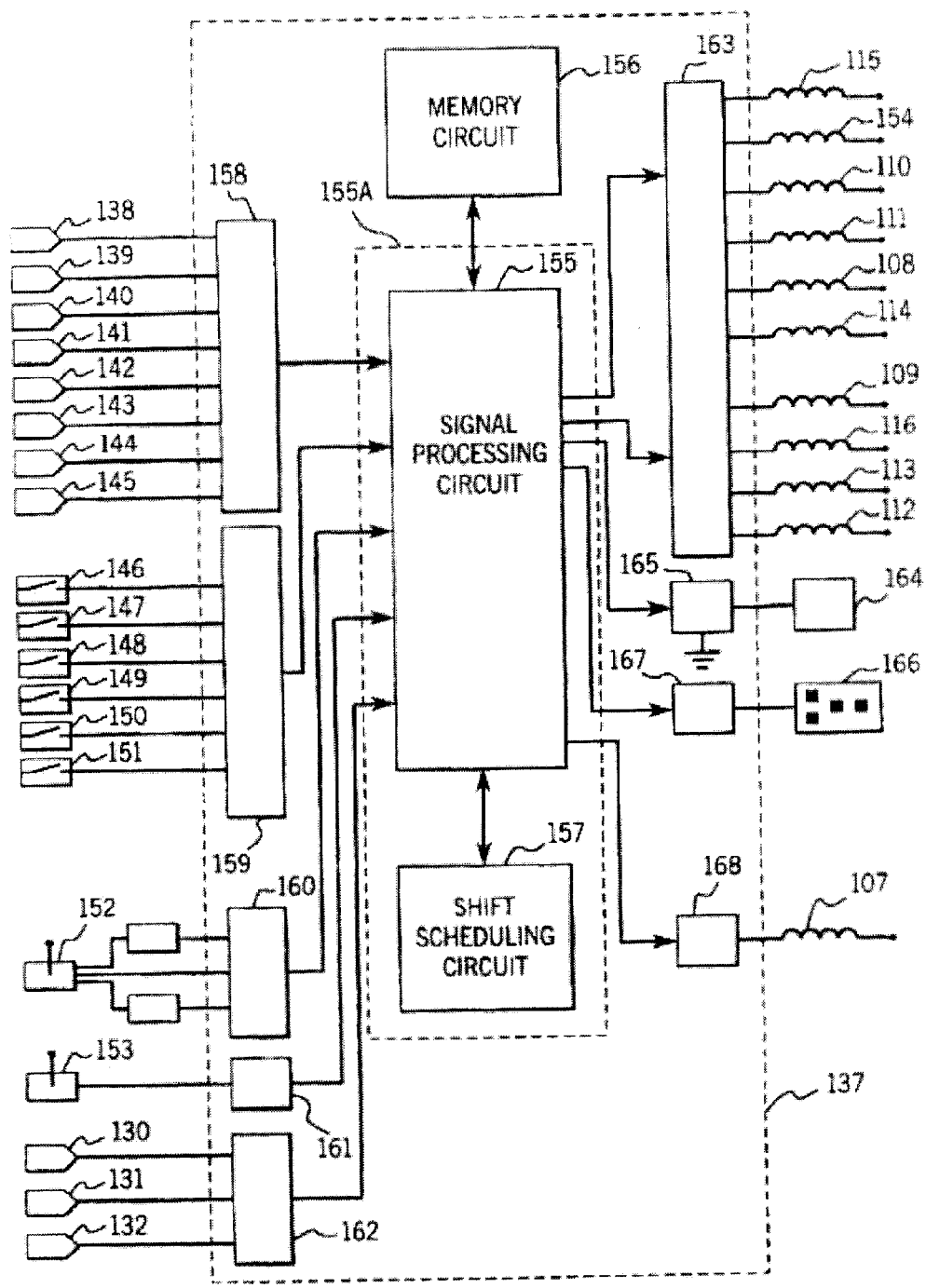
FIG. 9 is a schematic diagram of a processing circuit configured to control clutches in a powershift transmission.

FIG. 9 illustrates a control system that provides for the operation of a work vehicle, including the engagement, disengagement, and calibration of clutches in the manner disclosed above. The control system includes transmission controller 137, which is responsive to speed sensors 138–142 generating signals indicative of transmission speed, axle shaft speeds, engine speed and ground speeds, switches and sensors indicative of clutch pedal position 143,150,151, additional sensors 144–45, and operator control switches 146–149,152–153. Transmission controller 137 in turn controls clutch solenoids 107–116 and 154 to engage and disengage clutches 43, 53, 53, 60, 61, 62, 64, 71, 72, 76 and master clutch 66, respectively. In the exemplary embodiment, controller 137 is a microprocessor-based digital controller including a signal processing circuit 155, typically configured through appropriate coding of a microprocessor 155A, such as an Intel 80C198 microcontroller. Controller 137 further includes appropriate memory circuitry 156, which preferably includes electronically erasable programmable read only non-volatile memory (EEPROM) and random access and read only memory (RAM and ROM) for storing a preset, cyclic transmission control routine implemented by signal processing circuit 155; includes calibration values for the various clutches and other calibrated components of the control system; and includes various temporarily stored values used by controller 137, such as command values, sensed values and the like. A shift scheduling circuit 157, illustrated in FIG. 9 as separate from signal processing circuit 155 and memory circuit 156, but typically configured via coding within the microprocessor, functions with signal processing circuit 155 to schedule shifts into and out of gear ratios based upon the control routine executed by signal processing circuit 155.

Signal processing circuit 155 preferably includes an on-board analog-to-digital converter (not represented in FIG. 9) for converting input parameter signals directly to digital signals for processing. However, controller 137 will typically include interface circuits 158,159,160,161,162 for converting and conditioning the sensed and command signals produced by the system sensors and command devices into filtered signals, and for isolating signal processing circuit 155 from power surges and the like. Moreover, controller 137 includes valve driver circuits 163, for converting control signals output by signal processing circuit 155 into drive signals for energizing valve coils 108–116 and 154. Neutral latch circuit 164 is also coupled to signal processing circuit 155, which monitors the state of circuit 164 and controls grounding of circuit 164 via driver 165. Display 166 is coupled to signal processing circuit 155 through an interface circuit 167. Creeper clutch solenoid 107 is coupled to signal processing circuit 155 through an interface circuit 168. The particular configuration of interface and driver circuits 158–163, 165, 167–168 will vary depending upon the particular sensors, command devices and signal processing circuitry employed in the system. The construction and operation of such interface circuitry is well known to those skilled in the art.

In operation, sensors 138–145 continuously apply their sensed parameter signals to interface circuit 158, which filters and converts these signals to a range and form usable by signal processing circuit 155. Similarly, command devices 146–149,152–153 apply signals to signal processing circuit 155 via their respective interface circuits 159–161, and pressure transducers 130–132 continuously apply their sensed pressure signals to interface circuit 162, which filters and converts these signals to a range and form usable by signal processing circuit 155. In particular, interface circuit 162 provides low pass filtering of the pressure signals to reject high frequency noise that may produce false minimum pressure readings, such as those taken in step 3 of FIG. 7. Signal processing circuit 155 typically accesses the various command signals periodically as required by the transmission control routine stored in memory circuit 156. When automatic/manual switch 146 is placed in its "manual" position, transmission 37 may be shifted upon direct command from the vehicle operator by manipulation of a clutch pedal (not shown) and levers 152, 153. When automatic/manual switch 146 is placed in its "automatic" position, however, signal processing circuit 155 cycles through the transmission control routine as accessed from memory circuit 156 and, based upon the input and command signals applied by the sensors and command devices, determines when and how transmission 37 is to be shifted between the gear ratios described above, as well as when portions of the control system should be disabled, such as by interrupting the ground to neutral latch circuit 164. As will be appreciated by those skilled in the art, memory circuit 156 stores as part of the control routine, a table of gear ratios available through particular combinations of transmission clutches as described above. Shifts selected by signal processing circuit 155 are based upon these preset combinations. The overall transmission control routine may include various subroutines for controlling transmission operation in specific situations. Generally, however, the overall control routine permits modulated shifting, including modulated shuttle shifting, skip shifting and power shifting, all of which are techniques well known in the art.

Signal processing circuit 155 cooperates with shift scheduling circuit 157 to schedule the shifts (i.e. engagement and disengagement of combinations of clutches) identified by signal processing circuit 155. As mentioned above, in the exemplary embodiment, signal processing circuit 155 and shift scheduling circuit 157 are configured in a programmed microprocessor, shift scheduling circuit 157 effectively being an aspect or subroutine of the overall control routine, adapted to schedule disengagement of "out-going" clutches and engagement of "in-coming" clutches to obtain smooth transitions between gear ratios. Based upon this scheduling, signal processing circuit 155 generates appropriate control signals to energize and deenergize coils 107–116, and 154, and applies these control signals to the coils through driver circuits 163 and 168 to execute the selected shifts. The transmission controller signals the oncoming clutches to engage (e.g. energizes the on-coming clutch valve solenoids) and signals the off-going clutches to disengage (e.g. de-energizes the off-going clutch valve solenoids) as described above, thereby reducing or eliminating torque holes and transmission lock-up.

Just as each on-coming clutch may delay engaging while it is filling with fluid, each off-going clutch may also delay disengaging while it is emptying of fluid. To compensate for this disengagement delay, the transmission controller may reduce the delay between signaling the on-coming clutches to engage and signaling the off-going clutches to disengage by an amount of time representative of this disengagement delay.

In normal operation, a vehicle operator typically configures the control system for automatic or manual operation by manipulating automatic/manual switch 146. The operator may then preselect forward and reverse commanded gear ratios, as described below, which are displayed on display 166. In the exemplary embodiment, these gear ratios may be preselected by the vehicle operator as described in greater detail below. Both the forward and reverse preselected gear ratios are then displayed on display 166. Controller 137 will then schedule shifts to obtain the commanded gear ratio upon forward/reverse/neutral/park ("FNRP") lever 152 being moved to either its "forward" or "reverse" position. Such shifting will typically be accomplished through the use of skip shifting, shuttle shifting and power shifting techniques as discussed above. During steady state operation of vehicle 10 in either the forward or the reverse direction, the preselected gear ratios indicated on display 166 will generally be engaged as the commanded gear ratio, unless changed by the operator. The operator may then increment or decrement the commanded gear ratio by moving "pulser" or "bump" lever 153 to its "increment" or "decrement" position. Bump lever 153 may be held in either position to increment or decrement the commanded gear ratio through more than one ratio. Bump lever 153 is released once the desired commanded gear ratio is reached. Bump lever 153 thus increments or decrements the gear ratio in the direction then currently selected via FNRP lever 152 (i.e. forward or reverse). As the forward and reverse gear ratios are incremented or decremented, these changes are indicated on display 166 and forward and reverse gear ratios stored in the memory circuit 156 are updated as described below. In response to such increments and decrements, controller 137 schedules and executes shifts to the desired gear ratio.

When power shifting, whether in automatic or manual mode, controller 137 must schedule clutch engagements and disengagements to avoid a torque hole or damage to the transmission, as explained above. Whenever controller 137 executes a shift, therefore, it energizes the on-coming clutch valve, and subsequently disengages an off-going clutch.

Figure 10:
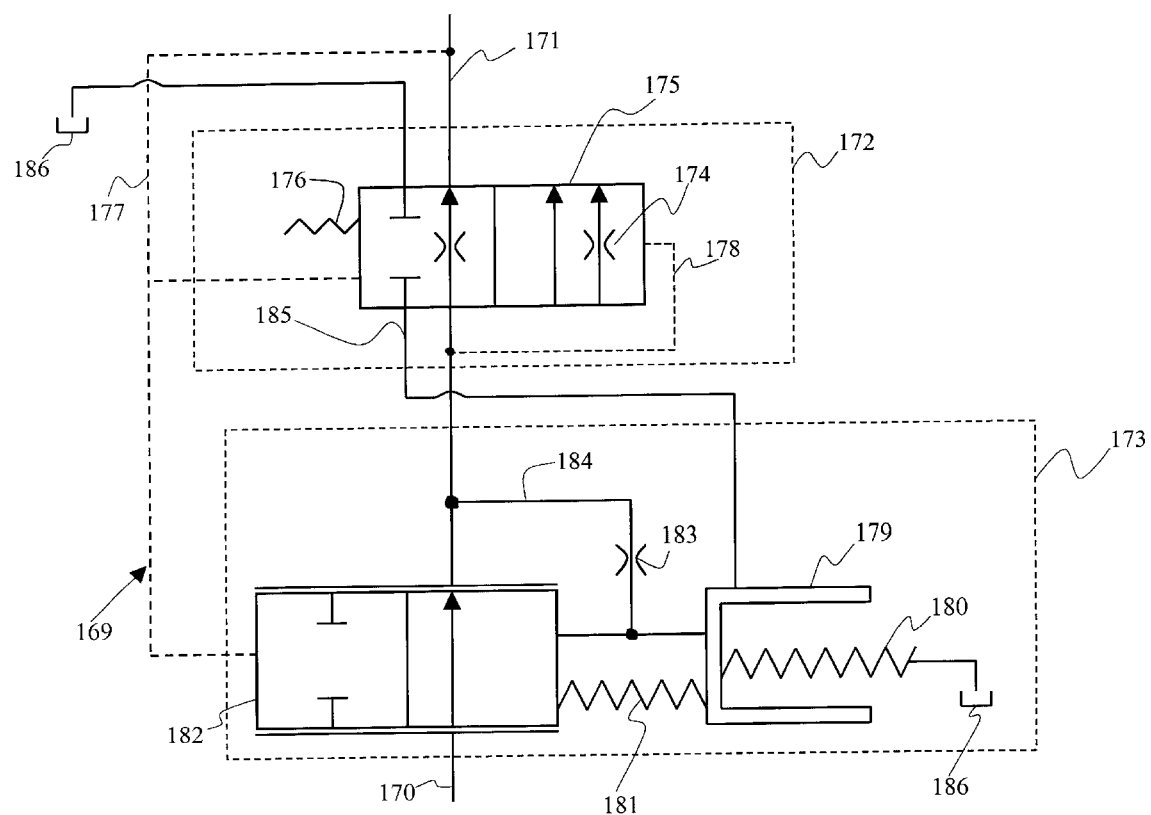
FIG. 10 is a schematic diagram of an exemplary flow restrictor.

By way of modification, flow restrictors 16 and 133–135 may be replaced by flow restrictor 169 disclosed in FIG. 10. Flow restrictor 169 has an inlet 170, an outlet 171, an unloading valve 172, and a modulator valve 173. Hydraulic fluid is supplied to inlet 170, and outlet 171 is coupled to the inlet of the clutch valve (not shown).

Unloading valve 172 is a spool valve, having an orifice 174 for restricting hydraulic fluid flow during the initial portion of the clutch filling process. Hydraulic fluid flowing through orifice 174 creates a pressure drop across the orifice that is monitored by the pressure transducer (not shown). Unloading valve 172 includes a spool 175 and a spring 176. The unloading valve is responsive to the pressure at outlet 171, as shown by the connection of pilot line 177 to a first end of unloading valve 172. Unloading valve 172 is also responsive to the hydraulic pressure between modulator valve 173 and unloading valve 172 (called the "check pressure"), as shown by the connection of pilot line 178 to a second end of the unloading valve. The unloading valve unloads modulator valve 173, which will be explained below.

Modulator valve 173 includes modulator piston 179, modulator piston spring 180, check pressure spring 181, modulator valve spool 182, and an unloading orifice 183. Modulator valve 173 is responsive to the pressure at the outlet, as shown by the connection of pilot line 177 to a first end of modulator valve 173. Modulator valve 173 is also responsive to the check pressure, as shown by the connection of pilot pressure line 184 to a second end of modulator valve 173 through orifice 183.

The modulator valve and the unloading valve cooperate in the following manner. When the clutch valves coupled to the outlet are closed, there is no hydraulic fluid flow through orifice 174, and thus no pressure drop across the orifice. The check pressure and the solenoid supply pressure are therefore the same. Since these two pressures act simultaneously on opposing ends of valve spools 175 and 182, they balance, and the spools assume the positions shown in FIG. 10 due to the operation of springs 176, 180, and 181. When a clutch valve coupled to the outlet of flow restrictor 169 is opened, fluid flows into the valve and the pressure at outlet 171 drops. This unbalanced pressure causes unloading valve spool 175 to shift rightwardly, thereby connecting unloading line 185 to tank 186. As a result of this unloading, pressure on modulator piston 179 drops, and modulator piston spring 180 impels the modulator piston toward modulator valve spool 182, compressing check pressure spring 181. Hydraulic fluid is metered through orifice 183, and escapes around the edge of modulator piston 179 into line 184 and thence to tank 186. The action of opposing springs 180 and 181 serve to maintain piston 179 in a constant position, and thus to maintain a constant and reduced hydraulic pressure on the right-most end of modulator valve spool 182. The pressure on the rightmost end of the modulator valve spool is thereby reduced. This reduced pressure does not shift modulator valve spool 182 rightwardly, however, because pressure on the leftmost end of the spool is reduced, due to the pressure drop across orifice 174. Thus, full flow through modulator valve 173 is maintained during the initial clutch filling period.

When the clutch is substantially filled with fluid, however, hydraulic fluid flow to the clutch being filled drops suddenly from about 5–6 gallons per minute to a few milliliters per minute and generates a sudden pressure increase at outlet 171. To prevent a too-rapid pressure rise and possible gear banging, flow restrictor 169 responds to this reduced flow and increased pressure by substantially restricting additional hydraulic fluid flow. This reduced flow provides a more gradual pressure increase in the clutch, thereby reducing or eliminating gear banging. Flow restrictor 169 reduces flow in the following manner. As the initial pressure increase appears at the outlet, the pressure begins rising in pilot line 177. Increasing pressure in line 177, combined with the spring force of spring 176 applied to the leftmost end of unloading spool 175 overcomes the force applied by hydraulic fluid in pilot line 178 acting on the rightmost end of unloading valve spool 175, and the spool shifts to the right, blocking off tank 186.

As the pressure at the outlet further increases, the pressure increases in pilot line 177 and shifts modulator valve spool 182 to the right, substantially cutting off flow through spool 182. The modulator valve acts as a flow restrictor, allowing limited flow, typically on the order of a few milliliters per minute to fill the clutch, thereby providing a restriction much greater than the restriction provided by orifice 174. By proper selection of orifice 183 and springs 180 and 181, the slope of the rising clutch pressure curve can be tailored to provide for clutch engagement sufficiently gradual to avoid damage to the transmission.

5. Sequencing of Clutches

Smoother operation of the previously described transmission, or any another transmission, is achievable by proper clutch sequencing during shifts. As discussed in relation to FIGS. 4 and 5 above, the exemplary embodiment advantageously provides an apparatus and method of sequencing that avoids both torque holes and transmission lockup. In general, data tables are maintained in memory 200 that contain sequencing related to upshifts, downshifts and vehicle load for individual clutches in the transmission.

During transmission shifts, the data tables are accessed to provide the desired clutch sequencing. The sequencing method proceeds according to the flow diagram shown in FIG. 11.

Figure 11:
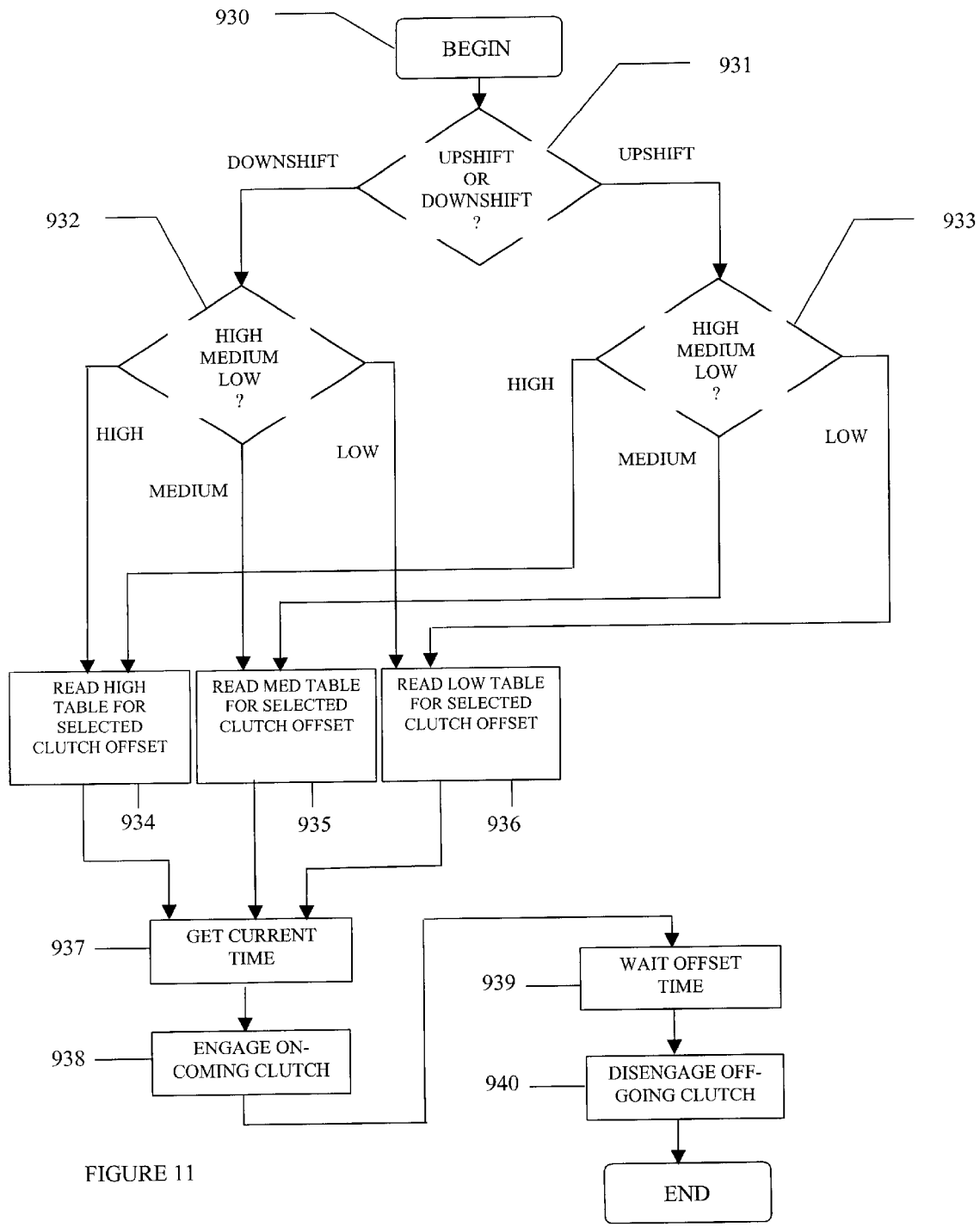
FIG. 11 is a flow diagram of clutch sequencing with three table values.

Referring to FIG. 11, in step 930 a shift is initiated by the shift initiator 170. Next, in step 931 a determination is made whether a downshift or an upshift is required. If a downshift is required, step 932 is performed next. Alternatively, if an upshift is required, step 933 is performed. In both step 932 and step 933, the engine torque is sensed and a determination of high, medium, or low torque is made. Preferably, in downshift step 932, low torque is engine torque between 0 and 45 percent of maximum engine torque, medium torque is engine torque between 45 and 75 percent of maximum engine torque, and high torque is engine torque between 75 and 100 percent of maximum engine torque. Preferably, in upshift step 933, low torque is engine torque between 0 and 40 percent of maximum engine torque, medium torque is engine torque between 40 and 70 percent of maximum engine torque, and high torque is engine torque between 70 and 100 percent of maximum engine torque. Of note, the torque threshold settings are different for upshifts and downshifts involving the same engaging clutch.

Of course, it should be recognized that the threshold levels are specific to the exemplary embodiment. Alternative exemplary embodiments, including engines with different maximum torque and transmissions with different characteristics, can use different percentages to define high, medium and low threshold levels. As the torque thresholds vary with each type of vehicle, they should be determined during vehicle development. In particular, these values will be determined empirically by having a tester drive the tractor with different values, with the values being selected depending upon which values provide the highest shift quality. Additionally, one of ordinary skill in the art would recognize that any number of threshold levels may be employed with corresponding sequence values to aid in clutch sequencing.

After determining the engine torque level, the corresponding OFFSET value is read from memory. Again, OFFSET is defined in relation to FIGS. 4 and 5. One of steps 934, 935 or 936 is performed to obtain the OFFSET value associated with the engaging clutch at the sensed torque and shift direction. The following table lists procedure related to steps 934, 935 or 936.

TABLE 2

Succeeding Step Exemplary Embodiment

| IF Shift Direction Is | AND IF Engine Torque Is | Then Execute |
|---|---|---|
| Downshift | High | Step 934 |
| Downshift | Medium | Step 935 |
| Downshift | Low | Step 936 |
| Up-shift | High | Step 934 |
| Up-shift | Medium | Step 935 |
| Up-shift | Low | Step 936 |

Thus, as an example, during an upshift where engine torque is high, step 934 is performed. In step 934, a table in memory holding the OFFSET value associated with high engine torque for the engaging clutch is read.

After obtaining the desired OFFSET value from memory, the desired shift is executed using the OFFSET timing. Thus, in step 937, the current time is updated as $t_i$. Next, in step 938, the on-coming clutch is engaged. In step 938, clutch engagement is caused at time $t_i$ by energizing valve 260 as described with respect to FIG. 1. After engaging the on-coming clutch in step 938, step 939 is executed. Step 939 requires waiting for a period of time equal to the OFFSET time before proceeding to step 940. In step 940, the off-going clutch is disengaged and the shift is completed. Thus, the off-going clutch is disengaged at time $t_i$+OFFSET. Alternatively, steps 940 and 938 may be exchanged if OFFSET is a negative number (i.e., the off-going clutch is disengaged before the on-coming clutch is engaged).

The following tables show preferable OFFSET times dependent upon vehicle load. TABLES 3 through 5 are for shifts under low, medium, and high loads, respectively. It should be recognized that the meaning of high, medium and low is dependent upon shift direction. Thus, the values of TABLES 3 through 5 are accessed at different levels of engine torque for a downshift as opposed to an upshift.

TABLE 3

Shift under low load

| Shift | Ce on X msec Before Co off | Co on X msec Before Ce off | C3 on X msec Before C1 off | C5 on X msec Before C3 off | C1 on X msec Before C5 off | Cn off X msec Before CL off | Ch on X msec Before Cn off | Co on X msec Before C3 on | Co on X msec Before C5 on | Co on X msec Before C1 on | Co on X msec Before Cn on | Co on X msec Before CH on |
|---|---|---|---|---|---|---|---|---|---|---|---|---|
| ->2 | 110 | | | | | | | | | | | |
| ->3 | | 100 | 90 | | | | | -10 | | | | |
| ->4 | 110 | | | | | | | | | | | |
| ->5 | | 110 | | 90 | | | | | -20 | | | |
| ->6 | 110 | | | | | | | | | | | |
| ->7 | | 240 | | | 120 | 10 | | | | -120 | -230 | |
| ->8 | 120 | | | | | | | | | | | |
| ->9 | | 110 | 90 | | | | | -20 | | | | |
| ->10 | 140 | | | | | | | | | | | |
| ->11 | | 130 | | 100 | | | | | -30 | | | |
| ->12 | 130 | | | | | | | | | | | |
| ->13 | | 100 | | | 120 | 100 | | | | 20 | | 0 |
| ->14 | 110 | | | | | | | | | | | |
| ->15 | | 100 | 90 | | | | | -10 | | | | |
| ->16 | 120 | | | | | | | | | | | |
| ->17 | | 110 | | 100 | | | | | -10 | | | |
| ->18 | 120 | | | | | | | | | | | |

TABLE 4

Shift under medium load

| Shift | Ce on X msec Before Co off | Co on X msec Before Ce off | C3 on X msec Before C1 off | C5 on X msec Before C3 off | C1 on X msec Before C5 off | Cn off X msec Before CL off | Ch on X msec Before Cn off | Co on X msec Before C3 on | Co on X msec Before C5 on | Co on X msec Before C1 on | Co on X msec Before Cn on | Co on X msec Before CH on |
|---|---|---|---|---|---|---|---|---|---|---|---|---|
| ->2 | 110 | | | | | | | | | | | |
| ->3 | | 100 | 90 | | | | | -10 | | | | |
| ->4 | 110 | | | | | | | | | | | |
| ->5 | | 110 | | 90 | | | | | -20 | | | |
| ->6 | 110 | | | | | | | | | | | |
| ->7 | | 250 | | | 130 | 20 | | | | -120 | -230 | |
| ->8 | 120 | | | | | | | | | | | |
| ->9 | | 110 | 90 | | | | | -20 | | | | |
| ->10 | 140 | | | | | | | | | | | |
| ->11 | | 130 | | 100 | | | | | -30 | | | |
| ->12 | 130 | | | | | | | | | | | |
| ->13 | | 100 | | | 120 | | 130 | | | 20 | | 30 |
| ->14 | 110 | | | | | | | | | | | |
| ->15 | | 100 | 90 | | | | | -10 | | | | |
| ->16 | 120 | | | | | | | | | | | |
| ->17 | | 110 | | 100 | | | | | -10 | | | |
| ->18 | 120 | | | | | | | | | | | |

TABLE 5

Shift under high load

| Shift | Ce on X msec Before Co off | Co on X msec Before Ce off | C3 on X msec Before C1 off | C5 on X msec Before C3 off | C1 on X msec Before C5 off | Cn off X msec Before CL off | Ch on X msec Before Cn off | Co on X msec Before C3 on | Co on X msec Before C5 on | Co on X msec Before C1 on | Co on X msec Before Cn on | Co on X msec Before CH on |
|---|---|---|---|---|---|---|---|---|---|---|---|---|
| ->2 | 150 | | | | | | | | | | | |
| ->3 | | 140 | 130 | | | | | -10 | | | | |
| ->4 | 150 | | | | | | | | | | | |
| ->5 | | 150 | | 130 | | | | | -20 | | | |
| ->6 | 150 | | | | | | | | | | | |
| ->7 | | 280 | | | 130 | 20 | | | | -150 | -260 | |
| ->8 | 160 | | | | | | | | | | | |
| ->9 | | 150 | 130 | | | | | -20 | | | | |
| ->10 | 180 | | | | | | | | | | | |
| ->11 | | 170 | | 140 | | | | | -30 | | | |
| ->12 | 170 | | | | | | | | | | | |
| ->13 | | 140 | | | 130 | | 80 | | | -10 | | -60 |
| ->14 | 150 | | | | | | | | | | | |
| ->15 | | 140 | 130 | | | | | -10 | | | | |
| ->16 | 160 | | | | | | | | | | | |
| ->17 | | 150 | | | | | | | -10 | | | |
| ->18 | 160 | | | 140 | | | | | | | | |

Advantageously, the method described in relation to FIG. 11 requires only three OFFSET values (e.g., high, medium and low table value) for each clutch. This method allows for distinct torque values for upshifts and downshifts, yet is memory efficient and less code intensive. An alternate exemplary embodiment provides for six OFFSET values associated with each clutch. The alternate exemplary embodiment sacrifices memory and is more software intensive, but provides for distinct OFFSET values for up-shift, downshift and vehicle load.

Figure 12:
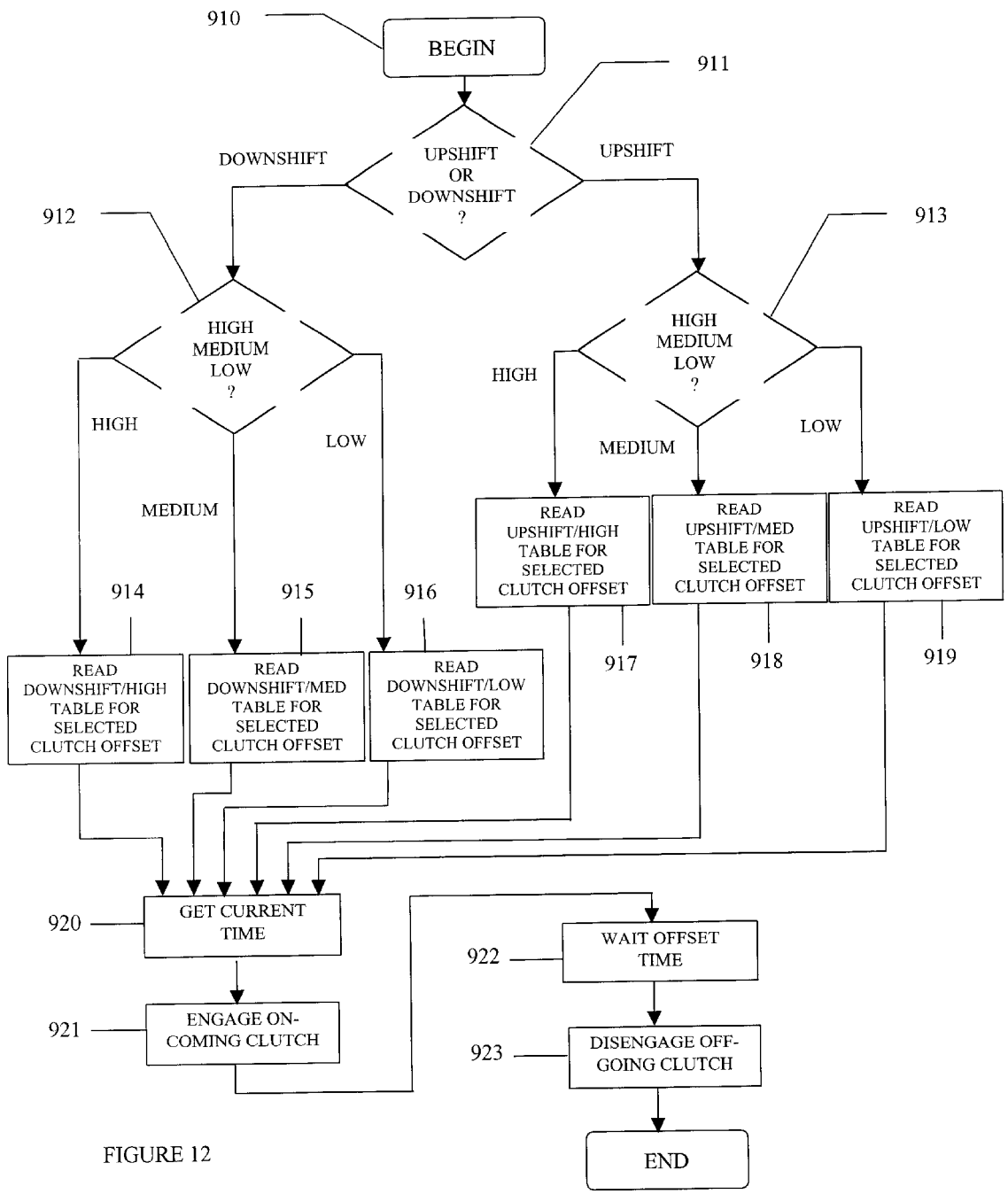
FIG. 12 is a flow diagram of clutch sequencing with six table values.

A flow diagram of the alternative embodiment of the exemplary embodiment is illustrated in FIG. 12. Referring to FIG. 12, in step 910 a shift is initiated by the shift initiator 170. Next, in step 911 a determination is made whether a downshift or an upshift is required. If a downshift is required, step 912 is next performed. Alternatively, if an upshift is required, step 913 is performed. In both step 912 and step 913, the engine torque is sensed and a determination of high, medium, or low torque is made. Preferably, engine torque levels are as discussed with relation to FIG. 11.

After determining the engine torque level, the corresponding OFFSET value is read from memory. Again, OFFSET is defined in relation to FIGS. 4 and 5. One of steps 914, 915, 916, 917, 918 or 919 is performed to obtain the OFFSET value associated with the engaging clutch at the sensed torque and shift direction. The following table lists procedure related to steps 914, 915, 916, 917, 918 or 919.

TABLE 6

Succeeding Step Alternative Exemplary Embodiment

| IF Shift Direction Is | AND IF Engine Torque Is | Then Execute |
|---|---|---|
| Downshift | High | Step 914 |
| Downshift | Medium | Step 915 |
| Downshift | Low | Step 916 |
| Up-shift | High | Step 917 |
| Up-shift | Medium | Step 918 |
| Up-shift | Low | Step 919 |

Thus, as an example, during a downshift where engine torque is low, step 919 is performed. In step 919, a table in memory holding the OFFSET value associated with low engine torque and a downshift for the engaging clutch is read.

After obtaining the desired OFFSET value from memory, the desired shift is executed using the OFFSET timing. Thus, in step 920, the current time is updated as $t_i$. Next, in step 921, the on-coming clutch is engaged. In step 921, clutch engagement is caused at time $t_1$ by energizing valve 260 as described with respect to FIG. 1. After engaging the on-coming clutch in step 921, step 922 is executed. Step 922 requires waiting for a period of time equal to the OFFSET time before proceeding to step 923. In step 923, the off-going clutch is disengaged and the shift is completed. Thus, the off-going clutch is disengaged at time $t_i$+OFFSET. Again, steps 921 and 923 may be exchanged if OFFSET is a negative number.

The following tables show preferable OFFSET times dependent upon shift direction and vehicle load. TABLES 7 through 9 are for up-shifts under low, medium, and high loads, respectively. TABLES 10 through 12 are for downshifts under low, medium, and high loads, respectively.

TABLE 7

Upshift under low load

| Shift | Ce on X msec Before Co off | Co on X msec Before Ce off | C3 on X msec Before C1 off | C5 on X msec Before C3 off | C1 on X msec Before C5 off | Cn off X msec Before CL off | Ch on X msec Before Cn off | Co on X msec Before C3 on | Co on X msec Before C5 on | Co on X msec Before C1 on | Co on X msec Before Cn on | Co on X msec Before CH on |
|---|---|---|---|---|---|---|---|---|---|---|---|---|
| ->2 | 110 | | | | | | | | | | | |
| ->3 | | 100 | 90 | | | | | -10 | | | | |
| ->4 | 110 | | | | | | | | | | | |
| ->5 | | 110 | | 90 | | | | | -20 | | | |
| ->6 | 110 | | | | | | | | | | | |
| ->7 | | 240 | | | 120 | 10 | | | | | -120 | -230 |
| ->8 | 120 | | | | | | | | | | | |
| ->9 | | 110 | 90 | | | | | -20 | | | | |
| ->10 | 140 | | | | | | | | | | | |
| ->11 | | 130 | | 100 | | | | | -30 | | | |
| ->12 | 130 | | | | | | | | | | | |
| ->13 | | 100 | | | 120 | 100 | | | | 20 | | 0 |
| ->14 | 110 | | | | | | | | | | | |
| ->15 | | 100 | 90 | | | | | -10 | | | | |
| ->16 | 120 | | | | | | | | | | | |
| ->17 | | 110 | | 100 | | | | | -10 | | | |
| ->18 | 120 | | | | | | | | | | | |

TABLE 8

Upshift under medium load

| Shift | Ce on X msec Before Co off | Co on X msec Before Ce off | C3 on X msec Before C1 off | C5 on X msec Before C3 off | C1 on X msec Before C5 off | Cn off X msec Before CL off | Ch on X msec Before Cn off | Co on X msec Before C3 on | Co on X msec Before C5 on | Co on X msec Before C1 on | Co on X msec Before Cn on | Co on X msec Before CH on |
|---|---|---|---|---|---|---|---|---|---|---|---|---|
| ->2 | 110 | | | | | | | | | | | |
| ->3 | | 100 | 90 | | | | | -10 | | | | |
| ->4 | 110 | | | | | | | | | | | |
| ->5 | | 110 | | 90 | | | | | -20 | | | |
| ->6 | 110 | | | | | | | | | | | |
| ->7 | | 250 | | | 130 | 20 | | | | | -120 | -230 |
| ->8 | 120 | | | | | | | | | | | |
| ->9 | | 110 | 90 | | | | | -20 | | | | |
| ->10 | 140 | | | | | | | | | | | |
| ->11 | | 130 | | 100 | | | | | -30 | | | |
| ->12 | 130 | | | | | | | | | | | |
| ->13 | | 100 | | | 120 | 130 | | | | 20 | | 30 |
| ->14 | 110 | | | | | | | | | | | |
| ->15 | | 100 | 90 | | | | | -10 | | | | |

TABLE 8-continued

Upshift under medium load

| Shift | Ce on X msec Before Co off | Co on X msec Before Ce off | C3 on X msec Before C1 off | C5 on X msec Before C3 off | C1 on X msec Before C5 off | Cn off X msec Before CL off | Ch on X msec Before Cn off | Co on X msec Before C3 on | Co on X msec Before C5 on | Co on X msec Before C1 on | Co on X msec Before Cn on | Co on X msec Before CH on |
|---|---|---|---|---|---|---|---|---|---|---|---|---|
| ->16 | 120 | | | | | | | | | | | |
| ->17 | | 110 | 100 | | | | | | -10 | | | |
| ->18 | 120 | | | | | | | | | | | |

TABLE 9

Upshift under high load

| Shift | Ce on X msec Before Co off | Co on X msec Before Ce off | C3 on X msec Before C1 off | C5 on X msec Before C3 off | C1 on X msec Before C5 off | Cn off X msec Before CL off | Ch on X msec Before Cn off | Co on X msec Before C3 on | Co on X msec Before C5 on | Co on X msec Before C1 on | Co on X msec Before Cn on | Co on X msec Before CH on |
|---|---|---|---|---|---|---|---|---|---|---|---|---|
| ->2 | 150 | | | | | | | | | | | |
| ->3 | | 140 | 130 | | | | | | -10 | | | |
| ->4 | 150 | | | | | | | | | | | |
| ->5 | | 150 | | 130 | | | | | -20 | | | |
| ->6 | 150 | | | | | | | | | | | |
| ->7 | | 280 | | 130 | 20 | | | | | -150 | -260 | |
| ->8 | 160 | | | | | | | | | | | |
| ->9 | | 150 | 130 | | | | | | -20 | | | |
| ->10 | 180 | | | | | | | | | | | |
| ->11 | | 170 | | 140 | | | | | -30 | | | |
| ->12 | 170 | | | | | | | | | | | |
| ->13 | | 140 | | 130 | | | 80 | | | -10 | | -60 |
| ->14 | 150 | | | | | | | | | | | |
| ->15 | | 140 | 130 | | | | | | -10 | | | |
| ->16 | 160 | | | | | | | | | | | |
| ->17 | | 150 | | | | | | | -10 | | | |
| ->18 | 160 | | | 140 | | | | | | | | |

TABLE 10

Downshift under low load

| Shift | Co on X msec Before Ce off | Ce on X msec Before Co off | C1 on X msec Before C3 off | C3 on X msec Before C5 off | C5 on X msec Before C1 off | CL off X msec Before Cn off | Cn on X msec Before CHoff | Ce on X msec Before C3 on | Ce on X msec Before C1 on | Ce on X msec Before C5 on | Ce on X msec Before Cn on | Ce on X msec Before CL on |
|---|---|---|---|---|---|---|---|---|---|---|---|---|
| ->17 | 100 | | | | | | | | | | | |
| ->16 | | 120 | | 100 | | | | -20 | | | | |
| ->15 | 100 | | | | | | | | | | | |
| ->14 | | 120 | 120 | | | | | | 0 | | | |
| ->13 | 100 | | | | | | | | | | | |
| ->12 | | 120 | | | 50 | 50 | | | | -70 | -70 | |
| ->11 | 110 | | | | | | | | | | | |
| ->10 | | 120 | | 100 | | | | | | | | |
| ->9 | 100 | | | | | | | -20 | | | | |
| ->8 | | 130 | 140 | | | | | | 10 | | | |
| ->7 | 100 | | | | | | | | | | | |
| ->6 | | 170 | | | 70 | 150 | | | | -100 | -20 | |
| ->5 | 110 | | | | | | | | | | | |
| ->4 | | 110 | | 100 | | | | -10 | | | | |
| ->3 | 100 | | | | | | | | | | | |
| ->2 | | 120 | 130 | | | | | | 10 | | | |
| ->1 | 100 | | | | | | | | | | | |

TABLE 11

Downshift under medium load

| Shift | Co on X msec Before Ce off | Ce on X msec Before Co off | C1 on X msec Before C3 off | C3 on X msec Before C5 off | C5 on X msec Before C1 off | CL off X msec Before Cn off | Cn on X msec Before CHoff | Ce on X msec Before C3 on | Ce on X msec Before C1 on | Ce on X msec Before C5 on | Ce on X msec Before Cn on | Ce on X msec Before CL on |
|---|---|---|---|---|---|---|---|---|---|---|---|---|
| ->17 | 100 | | | | | | | | | | | |
| ->16 | | 120 | | 100 | | | | -20 | | | | |
| ->15 | 100 | | | | | | | | | | | |
| ->14 | | 120 | 120 | | | | | | 0 | | | |
| ->13 | 100 | | | | | | | | | | | |
| ->12 | | 120 | | | 120 | 50 | | | | 0 | -70 | |
| ->11 | 110 | | | | | | | | | | | |
| ->10 | | 120 | 100 | | | | | | | | | |
| ->9 | 100 | | | | | | | -20 | | | | |
| ->8 | | 130 | 140 | | | | | | | 10 | | |
| ->7 | 100 | | | | | | | | | | | |
| ->6 | | 270 | | | 150 | 160 | | | | | -120 | -110 |
| ->5 | 110 | | | | | | | | | | | |
| ->4 | | 110 | | 100 | | | | -10 | | | | |
| ->3 | 100 | | | | | | | | | | | |
| ->2 | | 120 | 130 | | | | | | | | 10 | |
| ->1 | 100 | | | | | | | | | | | |

TABLE 12

Downshift under high load

| Shift | Co on X msec Before Ce off | Ce on X msec Before Co off | C1 on X msec Before C3 off | C3 on X msec Before C5 off | C5 on X msec Before C1 off | CL off X msec Before Cn off | Cn on X msec Before CHoff | Ce on X msec Before C3 on | Ce on X msec Before C1 on | Ce on X msec Before C5 on | Ce on X msec Before Cn on | Ce on X msec Before CL on |
|---|---|---|---|---|---|---|---|---|---|---|---|---|
| ->17 | 140 | | | | | | | | | | | |
| ->16 | | 160 | | 140 | | | | -20 | | | | |
| ->15 | 140 | | | | | | | | | | | |
| ->14 | | 160 | 160 | | | | | | 0 | | | |
| ->13 | 140 | | | | | | | | | | | |
| ->12 | | 160 | | | 130 | 140 | | | | -30 | -20 | |
| ->11 | 150 | | | | | | | | | | | |
| ->10 | | 160 | 160 | | | | | | | | | |
| ->9 | 140 | | | | | | | 0 | | | | |
| ->8 | | 170 | 180 | | | | | | | 10 | | |
| ->7 | 140 | | | | | | | | | | | |
| ->6 | | 270 | | | 150 | 240 | | | | | -120 | -30 |
| ->5 | 150 | | | | | | | | | | | |
| ->4 | | 150 | | 140 | | | | -10 | | | | |
| ->3 | 140 | | | | | | | | | | | |
| ->2 | | 160 | 170 | | | | | | | | 10 | |
| ->1 | 140 | | | | | | | | | | | |

The processor 200 receives an engine torque signal from the electronic GOV control via the CAN bus. The engine torque is compared to the predetermined torque level to determine if the vehicle load is high, medium or low.

6. Conclusion

The exemplary embodiment advantageously allows for shift sequencing in a powershift transmission. This sequencing allows for control of torque holes and elimination of transmission overlap. Advantageously, the exemplary embodiment allows for shift sequencing dependent upon both vehicle load and shift direction. As it is desirable to eliminate torque holes during upshifts, yet allow small torque holes during downshifts, it is advantageous to control sequencing as a function of shift direction. Also, it is advantageous to control sequencing as a function of vehicle load because clutch engagement is a function of vehicle load.

It is understood that, while exemplary embodiments, examples, materials, and values are given, they are for the purpose of illustration only. The apparatus and method of the invention are not limited to the precise details and conditions disclosed. For example, in addition to the exemplary embodiment including three shift tables and the alternate exemplary embodiment with six tables, other numbers of shift tables are possible according the principles of the exemplary embodiment to create smooth shifting. Thus, changes may be made to the details disclosed without departing from the scope of the invention, which is defined by the following claims.

What is claimed is:

1. A method of controlling a plurality of clutches in a powershift transmission, the transmission being coupled to an engine of a work vehicle, the method comprising:

receiving a shift command having a shift direction;

selecting clutch timing based on the shift direction of the received shift command including selecting a variable time delay between the engagement of an on-coming clutch and the disengagement of an off-going clutch;

sensing vehicle load;

engaging an on-coming clutch; and disengaging an off-going clutch before, after, or during engaging the on coming clutch, wherein the time delay between engaging the on-coming clutch and disengaging the off-going clutch is based on the selected clutch timing, wherein the selected clutch timing is further based on the sensed vehicle load.

2. The method of claim 1, wherein the clutch timing is selected from a plurality of values stored in a table.

3. The method of claim 2, wherein the table includes an OFFSET value.

4. The method of claim 3, wherein the table further includes fill time.

5. The method of claim 2, wherein the table includes three sub-tables: (1) light load, (2) medium load, and (3) heavy load, further comprising selecting the clutch timing from one of three sub-tables based on a vehicle load.

6. The method of claim 2, wherein the table is accessed to provide one of six values: (1) upshift/light load, (2) upshift/medium load, (3) upshift/heavy load, (4) downshift/light load, (5) downshift/medium load, and (6) downshift/heavy load.

7. The method of claim 6, wherein the accessed value for the upshift light load is associated with 0 to 40 percent of available engine torque, the upshift medium load is associated with 40–70 percent of available engine torque, and the upshift heavy load is associated with 70 to 100 percent of engine torque.

8. The method of claim 6, wherein the accessed value for the downshift light load is associated with 0 to 45 percent of available engine torque, the downshift medium load is associated with 45–75 percent of available engine torque, and the downshift heavy load is associated with 75 to 100 percent of engine torque.

9. The method of claim 5, wherein three sub-tables are included for each clutch in the transmission.

10. The method of claim 4, further comprising calibrating the transmission to generate a fill time.

11. The method of claim 1, wherein the sensing vehicle loading is accomplished by an electronic engine governor attached to the engine of the vehicle.

12. The method of claim 1, wherein the clutches are filled with fluid controlled by an on/off valve.

13. An apparatus for controlling operation of a powershift transmission, the transmission being coupled to an engine of an off-road vehicle, the apparatus comprising:

a sensor for sensing vehicle load;

a plurality of clutches;

a plurality of on/off valves for controlling fluid flow to the clutches; and a table of clutch parameters, wherein the clutch parameters correspond to the vehicle load and clutch characteristics, whereby clutch parameters indicate sequencing of the on/off valves thereby providing smooth shifting in the transmission said parameters including data indicative of at least two different selectable intervals between an on-coming clutch engagement and an off-going clutch disengagement for each of said plurality of clutches.

14. The apparatus of claim 13, wherein the table includes parameters corresponding to an upshift.

15. The apparatus of claim 14, wherein the table further includes parameters corresponding to a downshift.

16. The apparatus of claim 13, wherein the table includes an OFFSET time corresponding to vehicle load for each clutch in the transmission.

17. The apparatus of claim 16, wherein the table further includes a fill time.

18. The apparatus of claim 15, wherein the table includes the following sets of values: (1) upshift/light load, (2) upshift/medium load, (3) upshift/heavy load, (4) downshift/light load, (5) downshift/medium load, and (6) downshift/heavy load.

19. The apparatus of claim 18, wherein, for an upshift, a light load is defined as 0 to 40 percent of available engine torque, a medium load is defined as 40–70 percent of available engine torque, and a heavy load is defined as 70 to 100 percent of engine torque.

20. The apparatus of claim 18, wherein, for a downshift, a light load is defined as 0 to 45 percent of available engine torque, a medium load is defined as 45 to 75 percent of available engine torque, and a heavy load is defined as 75 to 100 percent of engine torque.

21. The apparatus of claim 20, wherein the table is comprised of separate tables for each of the clutches in the transmission.

22. The apparatus of claim 16, wherein the table is comprised of static values.

23. The apparatus of claim 13, wherein the sensor includes an electronic engine governor, whereby the governor provides an approximation of vehicle load.

24. An electronic transmission control system for controlling clutch sequencing in a powershift transmission having a plurality of clutches, the transmission being coupled to an engine of a work vehicle, the control system comprising:

a sensor configured to sense vehicle load and to provide a load signal;

a plurality of tables having clutch timing parameters said plurality of tables including data indicative of at least two different selectable intervals between an on-coming clutch engagement and an off-going clutch disengagement for each of said plurality of clutches;

a controller configured to receive the load signal and to select one of the plurality of tables based on the load signal, wherein each table corresponds to a first range of vehicle loads during an upshift and a second range of vehicle loads during a downshift, the first and second ranges being different, wherein the controller controls the sequencing of the clutches based on a clutch timing parameter from the selected table.

25. The electronic transmission control system of claim 24, wherein the plurality of tables includes at least three, one table corresponding to a light vehicle load, one table corresponding to a medium vehicle load, and one table corresponding to a heavy vehicle load.

26. The electronic transmission control system of claim 25, wherein the table corresponding to the light vehicle load has the first range between 0 and 40 percent of available engine torque and the second range of between 0 and 45 percent of available engine torque.

27. An apparatus for controlling a plurality of clutches in a powershift transmission the transmission being coupled to an engine of an off-road vehicle, the apparatus comprising:

means for receiving a shift command;

means for selecting clutch timing, wherein the selected clutch timing is dependent upon shift direction of the received shift command;

means for sensing vehicle load, wherein the selected selected clutch timing is further dependent upon the sensed vehicle load;

means for engaging an on-coming clutch; and means for disengaging an off-going clutch, for the timing between disengaging the off-going clutch and engaging the on-coming clutch being defined by the selected clutch timing, said means for selecting at least including data indicative of at least two different selectable intervals between an on-coming clutch engagement point and an off-going clutch disengagement point for each of said plurality of clutches.

28. The apparatus of claim 27, wherein the selected clutch timing is stored in a table, wherein the table includes fill time and an OFFSET value.

29. The apparatus of claim 28, wherein the table includes three sub-tables: (1) light load, (2) medium load, and (3) heavy load.

30. The apparatus of claim 29, wherein the table includes six sub-tables: (1) upshift/light load, (2) upshift/medium load, (3) upshift/heavy load, (4) downshift/light load, (5) downshift/medium load, and (6) downshift/heavy load.

31. The apparatus of claim 30, wherein a table is included for each clutch in the transmission.

32. The apparatus of claim 31, wherein the clutches are filled with fluid controlled by an on/off valve.

* * * * *